May 16, 1933.  J. R. PEIRCE  1,909,549
ACCOUNTING MACHINE
Filed March 6, 1931   10 Sheets-Sheet 2

INVENTOR
BY ATTORNEY

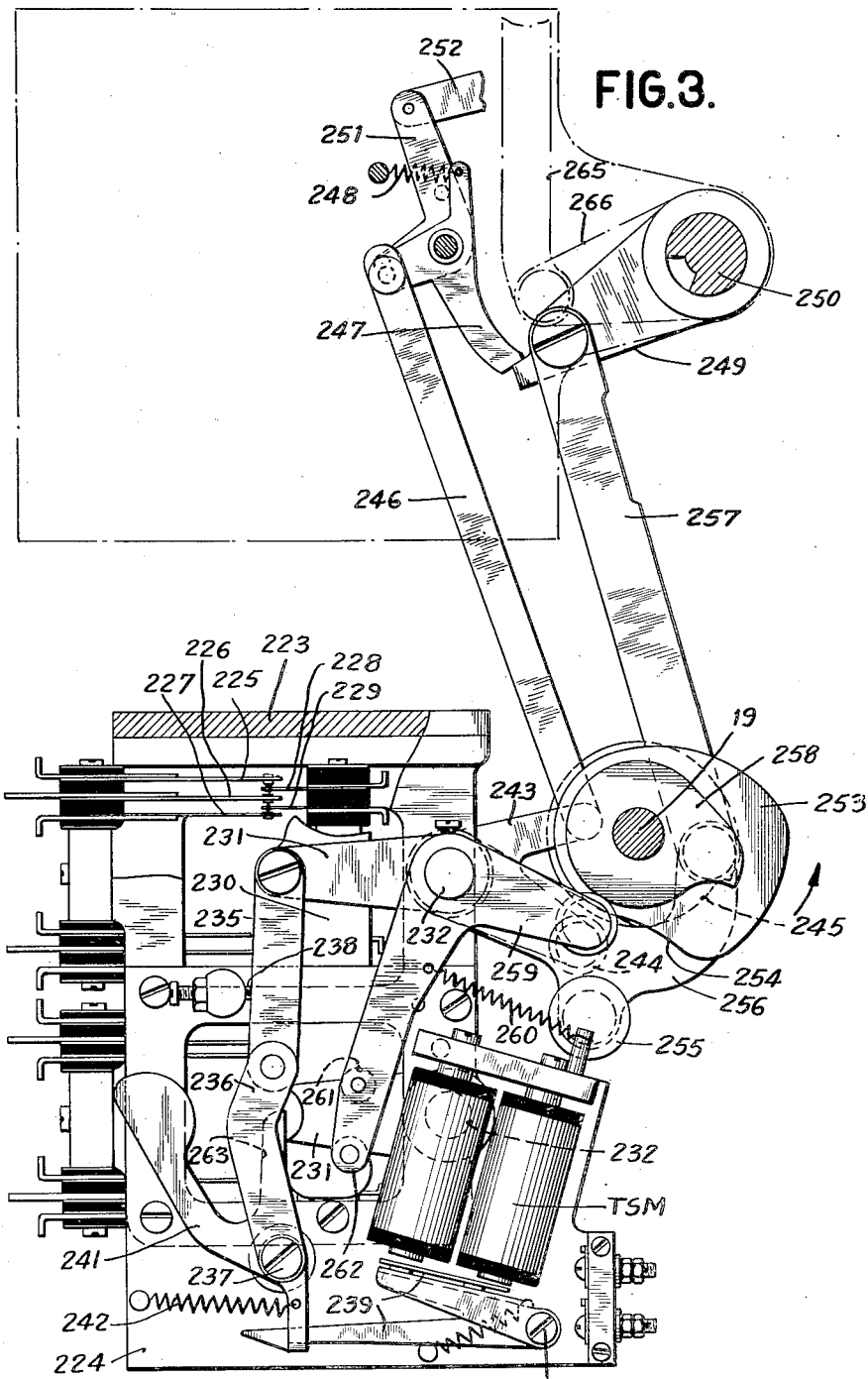

May 16, 1933.   J. R. PEIRCE   1,909,549
ACCOUNTING MACHINE
Filed March 6, 1931    10 Sheets-Sheet 4
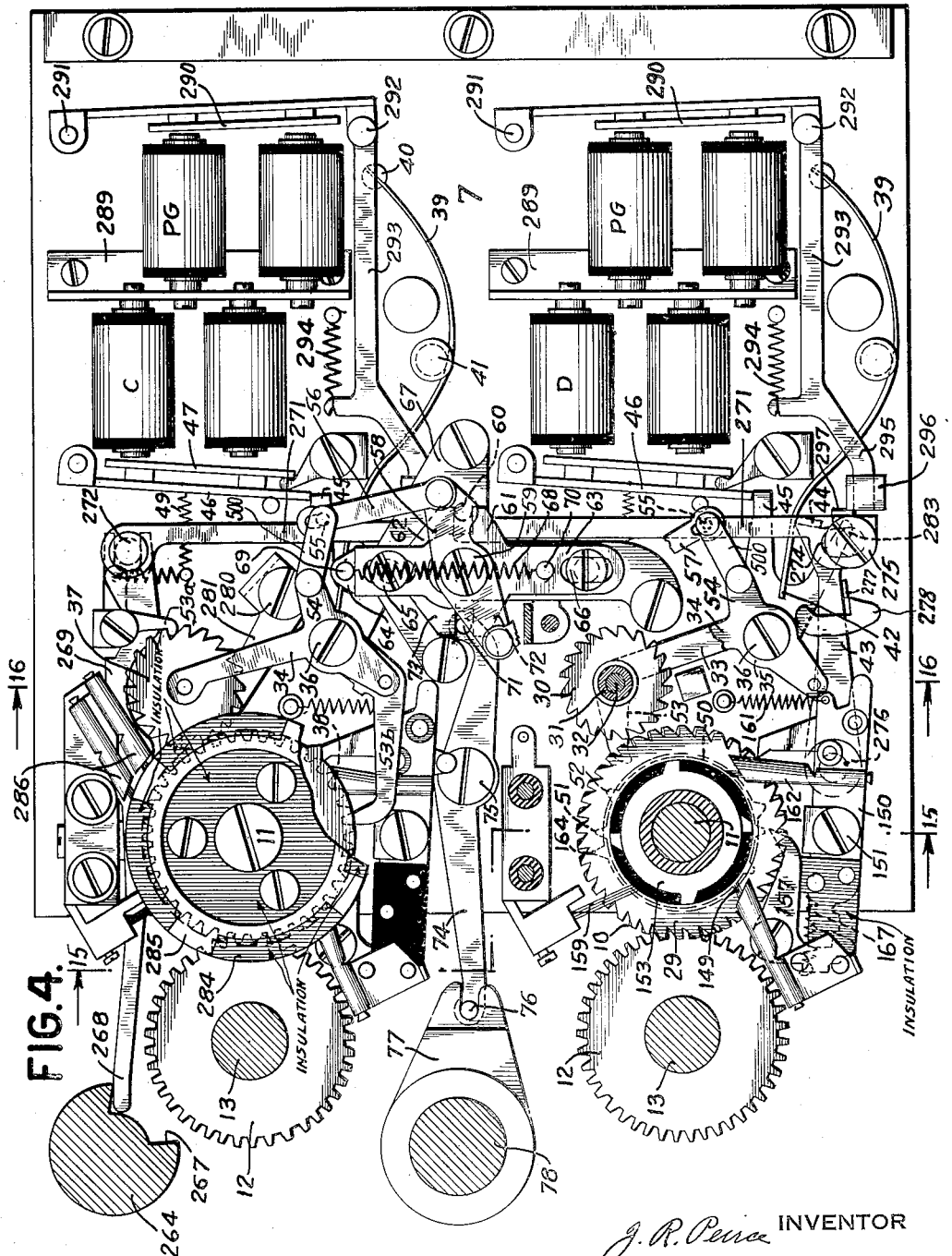

May 16, 1933.  J. R. PEIRCE  1,909,549
ACCOUNTING MACHINE
Filed March 6, 1931  10 Sheets-Sheet 5
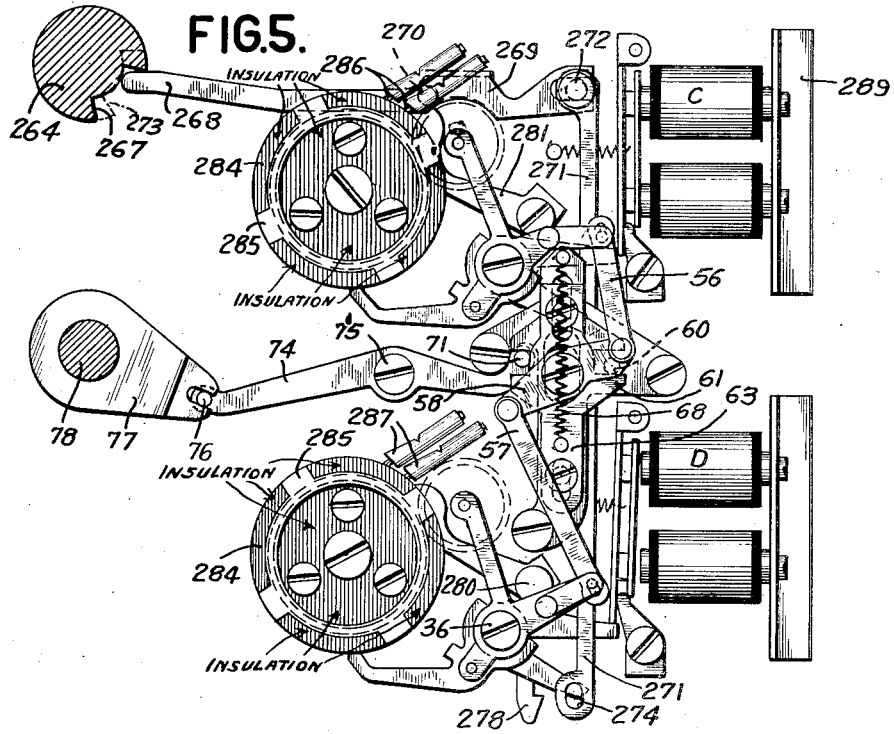
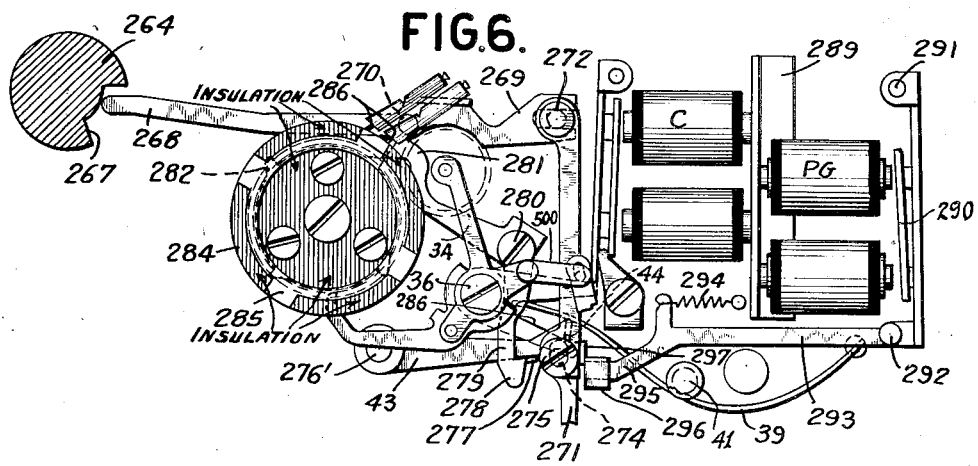
INVENTOR
J. R. Peirce
BY. ATTORNEY May 16, 1933.  J. R. PEIRCE  1,909,549
ACCOUNTING MACHINE
Filed March 6, 1931   10 Sheets-Sheet 6
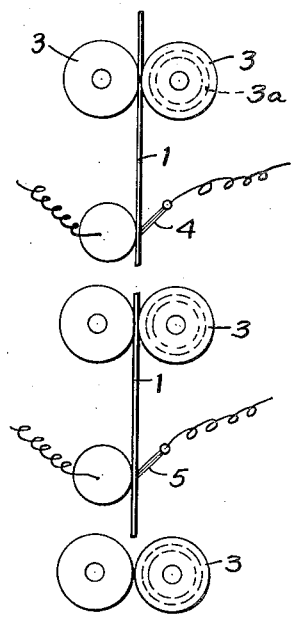
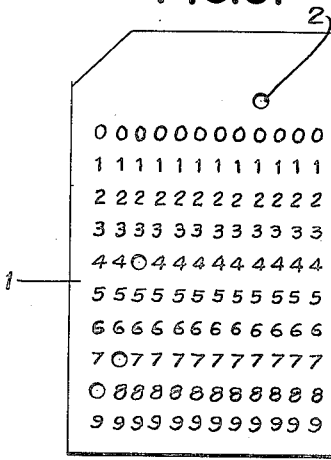
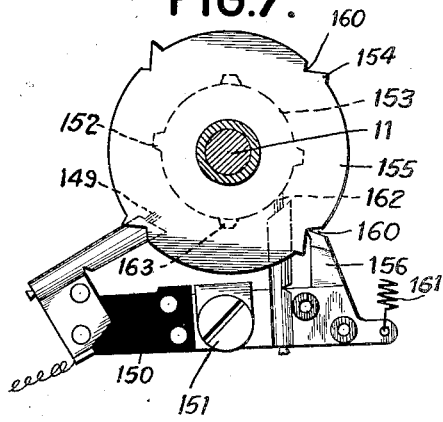
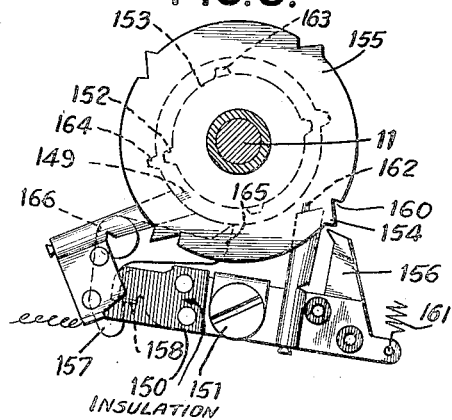
INVENTOR
J. R. Peirce
BY ATTORNEY May 16, 1933.  J. R. PEIRCE  1,909,549

ACCOUNTING MACHINE

Filed March 6, 1931    10 Sheets-Sheet 7

May 16, 1933. J. R. PEIRCE 1,909,549
ACCOUNTING MACHINE
Filed March 6, 1931 10 Sheets-Sheet 8

INVENTOR
*J. R. Peirce*
BY *his* ATTORNEY
*W. M. Wilson*

May 16, 1933.    J. R. PEIRCE    1,909,549
ACCOUNTING MACHINE
Filed March 6, 1931    10 Sheets-Sheet 9
FIG.13.
| Counter C | Counter D |
|---|---|
| 0 0 1 6 | 9 9 8 4 |
| 9 9 8 3 | 0 0 1 7 |
| 9 7 7 5 | 0 2 2 5 |
| 0 1 7 2 | 9 8 2 8 |
| 9 9 4 6 | 0 0 5 4 |
| 0 2 1 0 | 9 7 9 0 |
| 0 1 2 9 | 9 8 7 1 |
| 9 9 3 8 | 0 0 6 2 |
| 9 9 4 2 | 0 0 5 8 |
| 0 1 6 5 | 9 8 3 5 |
| 0 0 1 6 | 0 0 0 0 |
| 0 0 0 0 | 0 0 1 7 |
| 0 0 0 0 | 0 2 2 5 |
| 0 1 7 2 | 0 0 0 0 |
| 0 1 8 8 | 0 2 4 2 |
FIG.14.
```
    1 6
  - 1 7
  -2 2 5
    1 7 2
*-  5 4
    2 1 0
    1 2 9
  -  6 2
  -  5 8
*  1 6 5
```
— 222
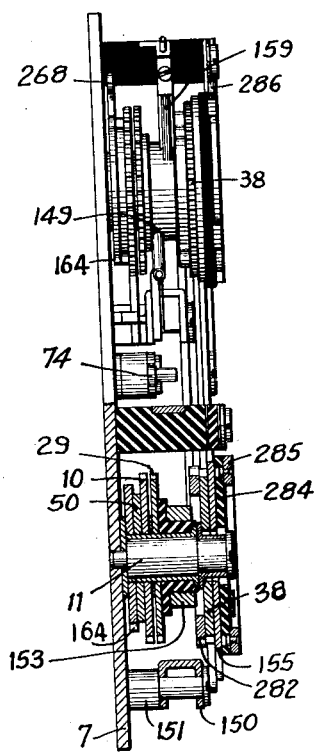
FIG.15.
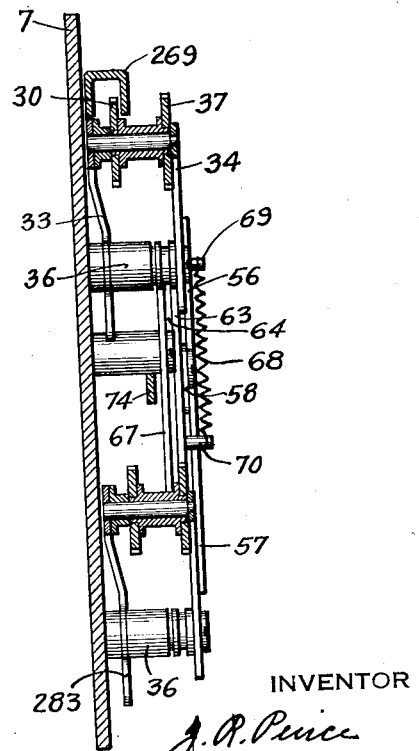
FIG.16.
INVENTOR
J. R. Peirce
BY his ATTORNEY

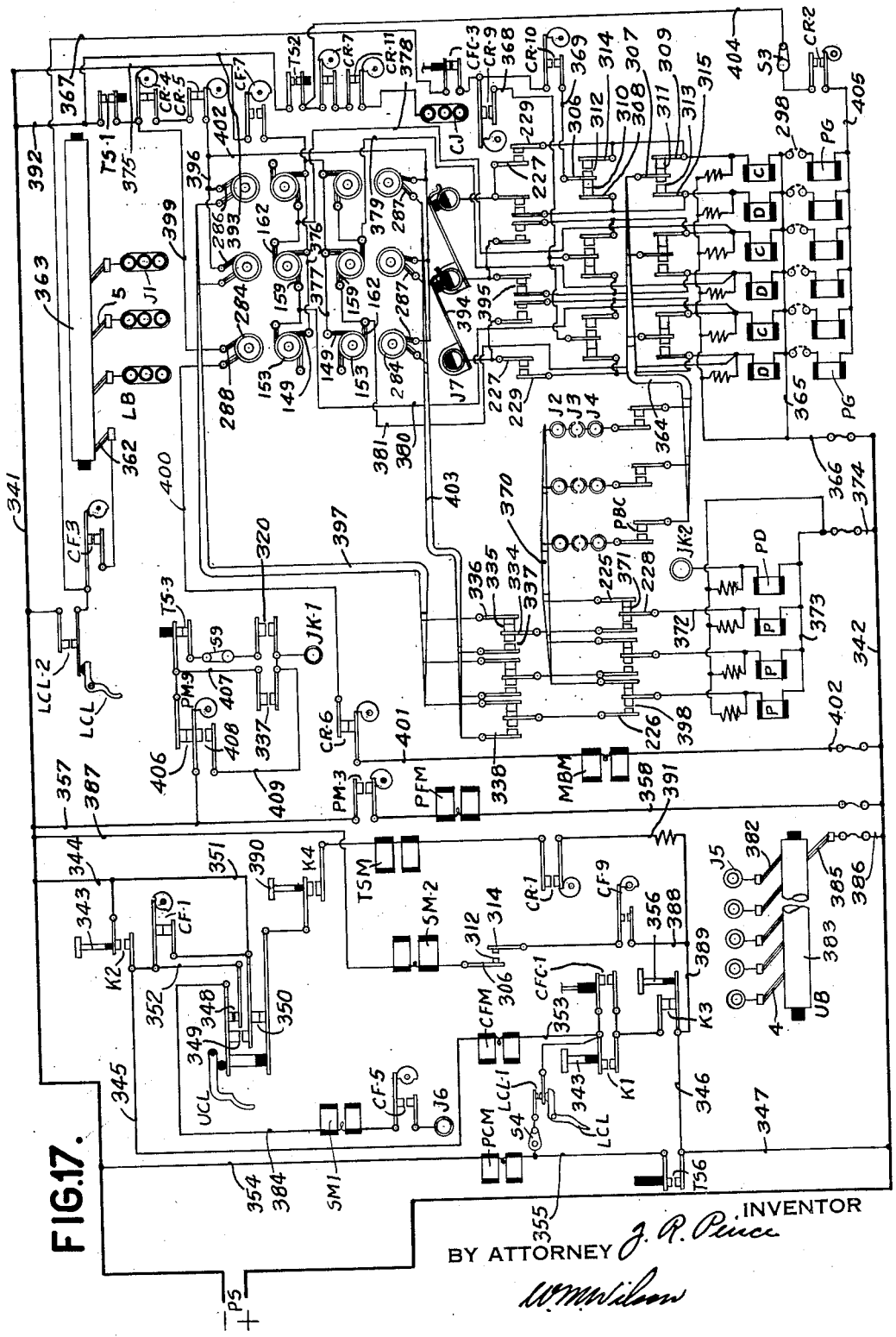

Patented May 16, 1933

1,909,549

UNITED STATES PATENT OFFICE

JOHN ROYDEN PEIRCE, OF NEW YORK, N. Y., ASSIGNOR, BY MESNE ASSIGNMENTS, TO THE TABULATING MACHINE COMPANY, OF NEW YORK, N. Y., A CORPORATION OF NEW JERSEY

ACCOUNTING MACHINE

Application filed March 6, 1931. Serial No. 520,506.

This invention relates to improvements in accounting machines and more particularly is related to perforated card controlled accounting apparatus which will receive different classes of entries such as debits or credits and which will finally give by operation of the machine a true net balance whether negative or positive, i. e. debit or credit.

In my copending application for patent, Serial No. 442,348, filed April 7, 1930, I disclose a tabulating machine adapted to analyze perforated records as the records are being fed through the machine and to accumulate and list data contained on such record cards and also to print totals of data accumulated from said cards.

In another copending application Serial No. 426,582, filed February 7, 1930, I disclose a machine with subtracting devices that are adapted to add the true numbers of credit items and complements of debit items and print the total whether the balance is a positive or negative amount. The highest order pinion in the accumulator is sensed before totaling to detect the presence of a nine on the pinion. Upon finding a nine the total is read off an auxiliary commutator which holds the complement of the debit values in the accumulator and thus there will be indicated a negative total by a printed true number. If the pinion stands at zero, a positive total is taken under control of the regular accumulating mechanism.

In the present invention I employ an accounting machine similar to that disclosed in the above mentioned application but I employ a novel type of accumulating mechanism. There is also disclosed in the present invention devices enabling the taking of progressive totals in a novel way.

An object of the invention is to provide an improved form of subtracting mechanism.

Another object is to provide a progressive totaling mechanism of an improved type.

Another object is to provide an accumulating structure in which two accumulator engaging mechanisms are connected by devices enabling the control of one accumulator by the other for subtraction.

Another object is to construct the novel subtracting devices so that a number will be added to an amount in one accumulator and the complement of the number will be added to the complement of the amount in another accumulator, the result being that a true balance, either positive or negative, will be registered in one of the accumulators. The subtraction operation is performed without the use of the usual translator.

A further object of the invention is to provide an improved form of selecting mechanism whereby the natural numbers and complements are selectively entered in the proper accumulators.

A feature of the invention is the provision of positively actuated devices for controlling the differential tensioning of a spring which in turn controls the addition of true numbers and complements in a plurality of accumulators. Tensioning of the spring may be prevented by disabling the actuating devices. This is done when adding or totaling operations are desired.

In the present invention a linkage provided between two accumulators is adapted to control the disconnection of one or the other set of accumulator wheels from the driving means during subtraction. The linkage is constructed so that when it is in normal position it does not interfere with the ordinary movement of the accumulator wheel clutching gears in and out of mesh with the driving means.

Another object of the invention is to provide connections to the accumulator wheel meshing devices so that during total taking the wheels may be held in mesh with the driver and prevented from zeroizing; the wheels registering the same number after totaling that they registered before totaling.

According to the present invention two separate accumulators or balance counters are provided, all true credit amounts being added on one of them and all true debit amounts being added on the other. Also, in this pair of balance counters the complements of all true debit amounts are added on the counter which is accumulating the true credit amounts, and the complements of all true credit amounts are added on the counter which is accumulating the true debit amounts. The result is, if the total of the true credit amounts exceeds the total of the true debit amounts, a true number will appear on the first balance totalizer and the complement will appear on the second balance totalizer. Conversely, if the total of the true debit amounts entered in the totalizers exceeds the sum of the true credit amounts entered, the second balance totalizer will show a true negative amount or debit balance while its complement will appear on the first balance totalizer.

In the present invention in order to add the complement in one counter while the other counter is adding the true number, the counter pinion clutching frames are interconnected so that when a pinion of one counter is thrown into mesh with the driving means to add a certain amount, the related pinion in the other counter is pulled out of mesh with the driving means, it having been positioned in mesh with driving means early in the operation of the machine and has accumulated the complement of the amount when pulled out of mesh.

The connections between the two counter clutching frames comprise a linkage for spring urging the credit pinions into mesh with the drivers and the debit pinions out of mesh, or vice versa according to the direction in which a spring is tensioned by an electromagnetically controlled tensioning mechanism. The presence of a special perforation on a debit record card energizes the electromagnet and, through the tensioning mechanism, reverses the direction of the pull of the spring so that the debit pinions are urged to mesh and the credit pinions are thrown out of mesh when the debit pinions go into mesh with the drivers. A lever adjusted by the operator of the machine and having connections to the tensioning mechanism is adapted to neutralize the tensioning means so that the spring is not tensioned in either direction and the subtraction function is suppressed. The two accumulators may then be used as regular separate adding counters, there being slots in the subtraction linkage to permit the normal movement of the accumulator clutching frames.

If the machine is set for subtraction and a card containing perforations representing a credit item is being handled by the machine, the debit pinions are first automatically thrown in mesh with the drivers to start rotating so as to add the complement of the digits perforated on the credit card.

When the perforation in a certain column on the card reaches its sensing brush the related credit pinion is meshed with the driver and, by means of the subtraction linkage, disengages the debit pinion of the same denominational order, the debit pinion having added a number which is the complement of the amount to be added by the credit pinion. Other conditions obtain upon presentation of a debit item. A debit card is perforated with the amount in the usual way but in addition has a special perforation by means of which the subtraction control is electromagnetically changed so that the credit pinions are first automatically meshed to add the complement and are thrown out of mesh at the perforation position when the debit pinions are meshed to add the true amount.

In order to secure progressive totals, a magnet in addition to the usual counter magnets is provided in each denominational order of an accumulator. During total taking these magnets are adapted to be energized and when they are actuated they serve to obstruct the disengagement of the accumulator pinions at the zero position, thus keeping the pinions meshed with the actuators for ten steps of movement so that the accumulator will contain the same amount after totaling that it did before the totaling operation was initiated.

A feature of the present invention is the provision of a magnet in an accumulator for the purpose of cooperating with the accumulator wheel meshing devices as to secure a sub-total of the reading of the accumulator wheels.

The disclosed progressive totaling mechanism is very flexible in its control. One or more orders of an accumulator may have a sub-total or progressive total reading taken while the other orders of the accumulator are being zeroized by a clearing total.

A progressive total of one accumulator may be taken simultaneously with the taking of a clearing total of the other accumulator; the operation being accompanied by the printing of either total.

A progressive total of both accumulators may be taken simultaneously, one of the accumulators being selected to control printing.

The machine of the present invention is adapted to list and identify credit and debit items, and to print and identify progressive items, and clearing totals of the balance standing on an accumulator; the last mentioned operation being initiated by manipulation of a total key or by the automatic devices in the machine when changes occur in card group numbers.

Another object is to provide a total printing mechanism which normally prints a total or sub-total under control of the credit accumulator but if the total of the amounts subtracted is greater than the total of the amounts added the difference standing on the accumulators will be registered in the credit accumulator as the complement of a negative amount and indicated by the presence of a nine on the highest order wheel.

Then the total printing control is shifted so that a total is printed under control of the debit accumulator which contains a true number as the negative total or debit balance.

Further objects, uses, and advantages of the present invention will be hereinafter pointed out in the accompanying specification and claims and shown in the drawings which show by way of illustration what I now consider to be a preferred embodiment of the invention.

In the drawings:

Fig. 3 is a side elevational view of the total magnet with its controlling connections to the accumulator engagement control shaft and the list and total contacts.

Fig. 4 is a side elevational view of an accumulator unit with two accumulator wheels and the driving and selection control. Some of the parts are sectioned, and other parts are removed so that a clear showing of the totalizing mechanism may be made by the view in this illustration.

Fig. 5 is a side elevational view of the accumulator control mechanism for conditioning the accumulators for addition or subtraction.

Fig. 6 is a side elevational view of the upper accumulator showing the accumulator wheel in zero position.

Figs. 7 and 8 are detail views of mechanism for effecting carrying from one accumulator wheel to the wheel of the next higher order.

Fig. 9 is a view of a portion of a card used to control the machine.

Fig. 10 is a diagrammatic view showing the feed of the cards with respect to the perforation sensing brushes.

Fig. 13 is an illustration of the operation of the machine in adding and subtracting the credit and debit entries registered on the accumulators in the machine.

Fig. 14 is a portion of a record slip showing the recording of some of the items shown in Fig. 13.

Fig. 15 is a side view and section of the accumulator mechanism taken along lines 15—15 in Fig. 4.

Fig. 16 is a sectional elevation view of the accumulator taken along lines 16—16 in Fig. 4, showing the subtraction control linkage.

Fig. 17 is the wiring diagram of the machine.

Figure 1:
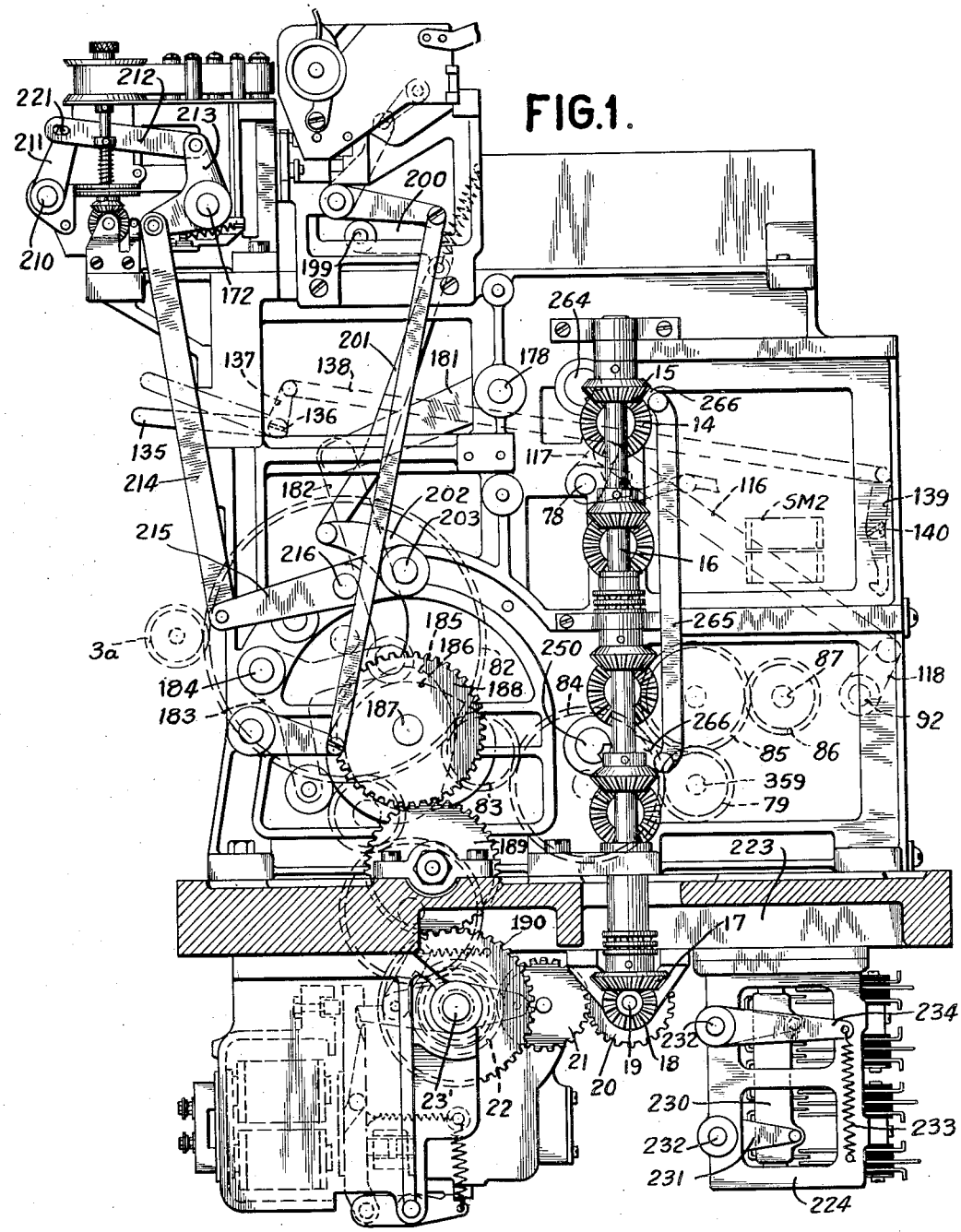
Fig. 1 is a side elevational view of the machine showing the driving and operating connections.

Referring to the portion of the record card 1 disclosed in Fig. 9, a plurality of columns of index point positions, ranging from 0 to 9, are shown. The amount which is to be added or subtracted is entered by perforations in successive columns. Thus the number 874 is entered by punching the card in the 8 position in the first column and in the 7 position in the second column and in the 4 position in the third column. The amount is punched in this manner whether it is to indicate a credit item or a debit item. If the card contains a debit item, a control perforation 2 is made in the upper portion of the card to control the machine to effect reverse operation of adding and subtracting in the two accumulators provided in the machine. In the absence of such a perforation the machine will effect adding of a true number in a credit accumulator and adding of the complement of the true number in a debit accumulator. In Fig. 9, the perforation 2 is shown above the ninth column of data on the card. In actual practice this perforation may be made above any of the columns and the machine may be plugged to control by a perforation above any column.

The card is fed through the machine by feed rollers 3 (Fig. 10) driven by pinions 3a (shown in Fig. 1) and will be analyzed by perforation sensing brushes 4 and 5. The card is fed past the brushes with the nines passing under the brushes first, followed by the eights, then the sevens and so on in a manner which is well known in this art.

The upper row of brushes 4 is used for controlling while the lower brushes 5 effect the adding and subtracting of the data contained on the card. When the data on the card is to be added on one of the accumulators and a perforation appears in the first column in the eight position (as in Fig. 9) then when the perforation passes under the brush 5, the accumulator wheel will be set to commence adding one unit as each of the succeeding points on the card passes under the brush 5. When the zero position is passing under the brush, the machine automatically disconnects the accumulator wheel so that it stops turning. It will thus have turned eight points to accumulate the value 8. In the second column the brush 5 will contact with the perforation in the 7 position and throw in its respective accumulator wheel to commence adding at this point, and 7 will have been added when the accumulator wheel is demeshed. In the third column the accumulator will be thrown in when the brush senses the perforation in the 4 position and 4 will be added. During the entry of a credit item the above is the adding operation that takes place on the credit accumulator. At the same time that this is occurring, by means of the subtracting connections between the credit accumulator and the debit accumulator, the debit accumulator is controlled so as to receive a complement of the number added in the credit accumulator. In order that the debit accumulator may receive the complemental amount the related accumulator actuating pinions are thrown in mesh so as to commence adding in all orders except the units order, when the 9 position on the card passes under the brushes 5. The units order pinion is thrown in mesh one step before the other pinions. When a perforation is sensed by the brushes 5 in any particular column the accumulator pinion in the debit accumulator through the connections to the related pinion in the credit accumulator will be disengaged so as to stop the accumulator. Thus with the card of Fig. 9 the debit accumulator pinion of the first column will commence accumulating as the 9 position passes its brush 5.

Then when the 8 position passes the brush the perforation in this position will be sensed and the energization of an electromagnet will cause the credit accumulator pinion to be engaged and it in turn will act to disengage the related pinion in the debit accumulator so that it will stop turning and accumulating. The pinion in the debit accumulator will thus have turned one point to accumulate the value one which is the complement of the numeral 8 which has been accumulated in the credit accumulator pinion of the same order. In the second column the pinion commences to rotate when the position 9 passes the brushes and will be thrown out when the 7 position passes the brush after the value 2 has been added to the debit wheel, this being the complement of the value 7 added to the credit wheel. In the third column or the units order of the figure being considered the associated debit wheel is thrown in at the tens position and will be thrown out when the 4 position reaches the brush and the pinion will have added 6 which is the tens complement of 4.

Should the card contain a debit item, it would be perforated with the perforation 2 as is the card shown in Fig. 9. When the perforation 2 is present it will be sensed by the brush 4 in the upper row of sensing brushes and the subtracting devices are actuated and serve to reverse the order in which the amount is added in the two accumulators. The amount is then added as a true number in the debit accumulator and the complement of the amount is added in the credit accumulator. The devices for performing this function of reversing the order of numeral reception by the two accumulators will be described later in the specification.

*Accumulator driving mechanism*

Figure 2:
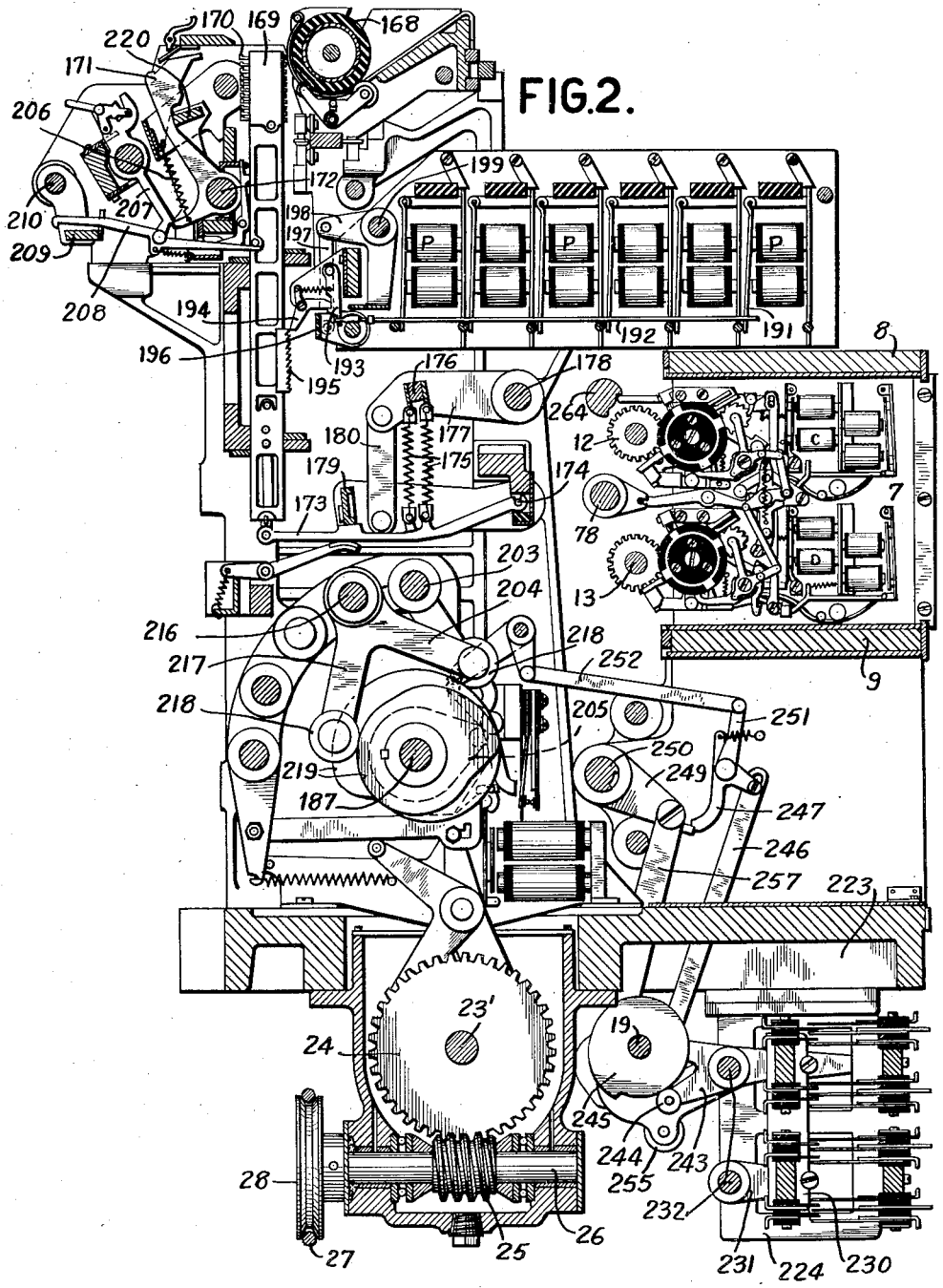
Fig. 2 is an elevational view of a section taken through the center of the machine. The printer, accumulator, control cams, and other devices in the machine are illustrated in this view.

In Figs. 2 and 4 is shown the manner of mounting the two accumulators on a plate 7. This plate may be held in the machine by sliding it between supporting frame members 8 and 9. A number of these units may be mounted in the machine side by side. Other of such units may be mounted in a space provided below the portion of the machine occupied by the units as shown in Fig. 2. As shown in Fig. 4 each accumulator has a gear 10 rotatably mounted on a stud 11 fixed in the plate 7. This gear is in constant mesh with a gear 12 mounted on a shaft 13 on which is also mounted a bevel gear 14 (Fig. 1) meshing with a bevel gear 15 on a vertical shaft 16. The shaft at its lower end has a bevel pinion 17 meshing with a bevel pinion 18 on a shaft 19 which has a gear 20 meshing with an idler gear 21 which in turn meshes with a gear 22 on shaft 23'. The latter shaft is provided with a worm wheel 24 (Fig. 2) meshing with a worm 25 on a shaft 26 which is driven by a belt 27 on grooved pulley 28 fixed to the shaft 26. The belt 27 is driven by an electric motor or some other source of power. The motor is constantly running while the machine is in operation, so that shaft 16 is turning constantly. Through the described driving connections the gear 10 in each accumulator order is adapted to rotate constantly.

*The credit and debit accumulators*

As both of the accumulators shown in Fig. 4 are similar in construction a description of one applies also to the other.

The gear 10 in each accumulator is secured to a gear 29 (Figs. 4 and 15) adapted to mesh with a gear 30 fixed on a sleeve 31 loose on a shaft 32 mounted in arms 33, 34 that are fixed on a bail 35 which is loose on the screw-headed stud 36. The gear 30 is normally disengaged from the gear 29. The teeth of the gears 29 and 30 are so pitched that the gear 30 may be moved into or out of mesh with the gear 29 while the latter is in continuous motion. Also fixed on the sleeve 31 with gear 30 is a gear 37. This gear 37 is in constant mesh with an accumulating gear 38 (Fig. 15) loose on stud 11.

The teeth of the gear 37 are longer than those of gear 30 so that the gear 37 may be moved toward and away from the gear 38 when the gear 30 is moved into and out of mesh with gear 29 without causing disengagement of gears 37 and 38. A spring 39 attached to post 40 and guided by post 41 in the plate 7 ends in a slot cut in one side of bail 35 in line with arm 33 at the point 42 as indicated in Fig. 4. An arm 43 engaging the spring 39 as at 44 tensions the spring to cause the frame 33, 34 to turn counterclockwise on the stud 36. An extension 45 of the arm 33 is normally latched by a latching member 46 fixed to the armature 47 of electromagnet C or D, the armature being held in such position by a spring 49. When the magnet is energized attracting its armature, the latch 46 releases the arm 45 and then the spring 39 rocks the gear 30 into mesh with the gear 29.

As explained before, the two accumulators are selectively engaged according to whether the item is a credit or a debit entry. The upper counter (Figs. 2 and 4) is adapted to receive the true amounts of credit items and the complements of debit items, while the lower or debit counter receives the true amounts representing debit items, and the complements of credit items. The energization of a credit counter magnet C during credit item entering or the energization of a debit counter magnet D during debit item entering, is effected by the sensing of a perforation in one of the data columns of the record card 1 (Fig. 9) by the respective sensing brush 5 (Fig. 10). The gear 30 is then thrown into mesh with the gear 29 while the latter is rotating. The gear 30 is thus caused to rotate until the zero position on the card reaches the brush 5 at which time it is thrown out of mesh by a cam 50 (Figs. 4 and 15). This cam is fixed with respect to gears 10 and 29 and thus is constantly rotating with them. As shown in Fig. 4 there are two projections 51 and two projections 52 on the cam 50. The cam is timed to turn a half revolution for each accumulating cycle. After the gear 30 has been thrown into mesh with gear 29 and commences to rotate gear 37, as soon as the projection 51 reaches an arm 53 fixed to arm 33, it will cam the arm 53 outwardly, rocking the frame 33, 34 about the pivot 36 to move the gear 30 out of mesh with gear 29 so that gear 37 and the accumulator wheel 38 will cease to rotate.

The pinion frame 33, 34 will then be latched in this position by the armature latch 46. An impositive latch 53a will prevent overthrow of the gear 37. Gear 38 also has an impositive latch 53b.

The above description deals mainly with the addition of an amount in an accumulator. If it is desired to subtract an amount from an accumulator the complement of the amount is added to the accumulator. This is done at the same time the amount is being added to the other accumulator. In adding the complement, the proper counter magnets are energized automatically at the 9 position (the units order at the 10 position) to mesh gears 30 with gears 29 and start the wheels rotating. Other means, however, must be provided to pull the subtracting gears out of mesh at the proper time when the related adding gears are going into mesh with the driving gears. The connections between the gear frames to secure the desired relationship between the meshing of one accumulator and the demeshing of the other accumulator will now be described.

The arm 34 (Fig. 4) of each gear frame 33, 34 is substantially at right angles to another arm 54 on the frame, a pin 55 being fixed near the end of each arm 54. The pin 55 in the arm 54 on the credit accumulator gear frame protrudes in a slot cut in a link 56. A thin oblong spring clip 500 riveted to arm 54, holds the link 56 on the stud 55. The lower accumulator gear frame has a pin 55 which fits in a slot in another link 57. Both links 56 and 57 are pivotally connected to the opposite ends of a lever or oscillating member 58 centrally pivoted at 59. A pin 60 mounted on one arm of lever 58 is located between two oppositely facing projections 61, 62 extending from a pair of slides 63 and 64 (see Fig. 16). Each slide has three guide slots through which project locating studs 65, 66 and 59 in an assembly plate 67. The plate is secured to frame 7 by three screws. The slides are urged in opposite directions by a common spring 68 attached at 69 to the lower slide 64 and at 70 to the upper slide 63.

The projection 61 extends from the upper slide 63 and contacts the lower edge of stud 60 to urge the arm 58 in a counterclockwise direction, and the other projection 62 on slide 64 urges arm 58 in a clockwise direction. The slides are normally held in the position shown in Fig. 4 by a stud 71 projecting between an extension 72 on slide 63 and an extension 73 on slide 64. Stud 71 is mounted in the end of one arm of a lever 74 pivoted at 75. The opposite arm of the lever 74 has a pin and slot connection 76 to a subtraction setting crank 77 fixed on a shaft 78. The crank arm 77 has three positions to which it is adjusted to govern adding and substracting operations. In Fig. 4 it is shown in the normal or neutral position. In Fig. 5 it is shown in the credit item entering position for effecting subtraction in the lower debit counter. To effect subtraction in the upper credit counter during debit item entering the crank 77 is rocked counterclockwise to a position (not shown) wherein pin and slot connection 76 is lifted above the position it occupies in Fig. 4.

With crank 77 in the normal or neutral position shown in Fig. 4, the linkage consisting of lever 74, pin 71, slides 63, 64, pin 60, and lever 58, serves to hold links 56 and 57 in the position shown. There it is noted that studs 55 on upper and lower gear frames 33, 34 are free to move upward in the slots in links 56 and 57, therefore pinion frames 33, 34 are free to move the gears 30 in and out of mesh with gears 29 to perform adding operations or take totals in the usual way.

When the machine is set for subtraction and a credit item is to be entered in the accumulators, the crank 77 is positioned as shown in Fig. 5. Then lever 74 is rocked and stud 71 is lifted carrying with it slide 64. Spring 68, because of its connection to stud 69 on the lifted slide 64, will be tensioned and will urge slide 63 to move upward. The extension 61 on slide 63 abuts against the under side of stud 60 and tends to rock lever 58 in a counterclockwise direction.

Figure 11:
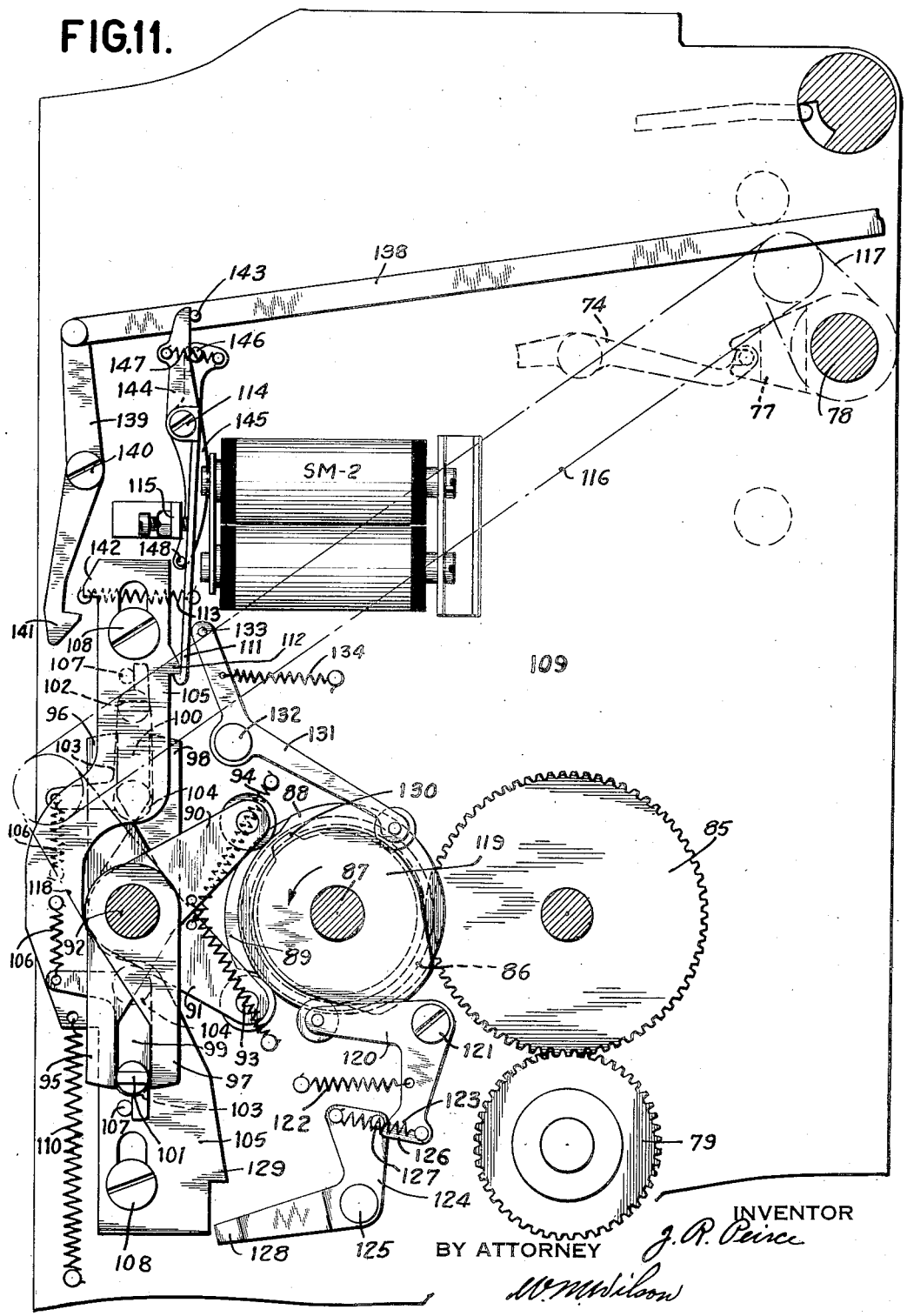
Fig. 11 is a side elevational view of the subtraction control mechanism.

gear 79 with gear 82. Gear 79 in turn, through an idler gear 85, drives a gear 86 and rotates the shaft 87 upon which gear 86 is mounted. Turning now to Fig. 11 it is seen that a series of cams are mounted on shaft 87. Two similarly shaped cams 88 and 89 are positioned to cooperate with rollers on a pair of subtraction control actuating levers 90 and 91. The levers are loosely mounted on a shaft 92 and are urged by springs 93 and 94 into cooperation with cams 88 and 89.

Spring 93 urges lever 90 in a clockwise direction so that its roller will contact cam 88, and spring 94 urges lever 91 in a counterclockwise direction bringing the roller in the lever against cam 89. Each lever is provided with an arm reaching into a vertical plane; the lever 90 having a downwardly extending arm 95, and lever 91 having an upwardly extending arm 96. Facing the arms 95 and 96 are a pair of arms 97 and 98 secured to the shaft 92. The contour of the arms 95, 96, 97, and 98 provides a straight sided space 99 between arms 95 and 97, and a similar space 100 between arms 96 and 98. A stud 101 is adapted to be inserted in the space 99 and when in this position will couple the two arms and transmit the movement of arm 95 to arm 97. Another stud 102 in a similar way may be placed in the opening 100 where it will move arm 98 if acted upon by arm 96. Each of the studs 101, 102 is mounted in a bell crank 103 pivoted at 104 on a subtraction selection slide 105. The studs are normally held in alinement with openings 99 and 100 by springs 106 connected between the slide 105 and the bell cranks 103 and holding the bell cranks against stop pins 107 on the slide. The ends of the studs 101, 102 are cut so that only the rectangular portions at the center of the studs enter the openings. The subtraction control slide 105 has two slots which guide it in vertical movement on the shoulders of two screws 108 fastened to the machine frame 109. A spring 110 connected between slide 105 and frame 109 tends to bring the slide into a lower position, but the slide is held in its upper position with stud 101 between arms 95 and 97 by means of a subtraction armature latch 111 engaging a shoulder 112 on the slide. The latch 111 is held in the position shown in Fig. 11 against a stop 115, by a spring 113, however, when magnet SM2 is energized latch 111 is drawn to the right about its pivot 114, releasing slide 105 which is then moved downwardly by spring 110. When slide 105 is in its lower position, stud 102 is in space 100 between arms 96 and 98, and stud 101 is moved out of space 99. The direction of the rocking movement imparted to shaft 92 by one of the cams on shaft 87 is determined by the selective positioning of stud 101 or 102 into effective position. The movement of shaft 92 is transmitted to shaft 78 by means of a link 116 (see Figs. 1 and 11) extending between an arm 117 fast to shaft 78 and an arm 118 secured on shaft 92 on which is also secured arms 97 and 98.

It is noted that the crank arm 77 described in connection with the mechanism in Fig. 4 is fixed on shaft 78. By means of these connections the positioning of arm 97 or arm 98 by cam 88 or cam 89 serves to place crank arm 77 in a lowered (see Fig. 5) or raised position.

At the beginning of each item entering operation the slide 105 occupies the position shown in Fig. 11 with the stud 101 in opening 99. If the item to be entered is a credit item, magnet SM2 will not be energized, latch 111 will not release slide 105, and stud 101 will remain in effective position. As shaft 87 rotates, cam 88 rocks lever 90 in a counterclockwise direction and holds it in rocked position during item entering by means of a dwell on the cam surface. The movement of lever 90 is transmitted through arm 95, stud 101 (bell crank 103 rocking about pivot 104), arm 97, shaft 92, arm 118, etc., resulting in the lowering of arm 77 into the position shown in Fig. 5. The control exerted by arm 77 to secure complemental addition on the debit accumulator when in such a position, has been discussed hereinbefore.

If the item to be entered is a debit item, the circuit through magnet SM2 is closed by a magnet controlled by a sensing brush 4 (Fig. 10). This particular brush is adapted to detect the presence of a debit indicating perforation 2 (Fig. 9). Magnet SM2 is energized, armature 111 is moved away from shoulder 112, and slide 105 is lowered by spring 110 placing stud 102 into space 100 before levers 90, 91 are moved by cams 88 and 89. Then, when lever 91 is rocked clockwise and held in position by cam 89, arm 96 by means of stud 102, transmits the movement of lever 91 to arm 98 and through the other connections the crank arm 77 is raised to a debit controlling position (not shown). When arm 77 is in this position the complement of the debit amount is added on the credit accumulator as already explained.

Near the end of each operation a mechanism for restoring the slide 105 functions to raise the slide if it has been tripped and lowered. A restoring cam 119 on shaft 87 cooperates with a roller on a bell crank 120 pivoted on a shouldered screw 121 in side frame 109. A spring 122 urges bell crank 120 and the attached roller into cooperation with cam 119. The vertical arm of bell crank 120 is connected by means of a spring 123 to a restoring lever 124 pivoted at 125. Another connection between crank 120 and lever 124 is in the form of a shoulder 126 on the vertical arm of member 120 and a pin 127 on lever 124 held in contact with shoulder 126 by spring 123. The horizontal end 128 of lever 124 underlies an extension 129 on slide 105. When the high portion on cam 119 rocks crank 120 in a counterclockwise direction, lever 124 is urged by spring 123 in a clockwise direction, raising end 128 and lifting slide 105 into restored position against the tension of spring 110. Should stud 101 fail to enter slot 99 immediately, spring 123 will yield preventing jamming or breaking of the parts until spring 106 aligns the stud and slot for engagement. The low concentric surface on cam 119 allows spring 122 to rock bell crank 120 in a clockwise direction. This movement in turn is imparted through shoulder 126 and stud 127 to rock lever 124 in a counterclockwise direction, thus lowering restoring arm 128 out of the path of the extension 129 on slide 105.

The magnet SM2 is energized while slide 105 is held up in restored position by lever 124, there then being no friction between projection 112 and latch 111 to overcome.

A means is provided to insure the release of armature latch 111 from magnet SM2 if held by residual magnetism, also to positively move the latch into a position wherein it locks the subtraction selection slide 105 in normal position. A knock-off cam 130 is mounted on shaft 87 and is provided with a cam surface cooperating with a roller at the end of one arm of a knock-off lever 131 pivoted at 132 in the side frame 109. The other arm of lever 131 has a pin 33 contacting the side of latch 111. A spring 134 holds lever 131 in cooperation with 130.

Near the end of each operation lever 131 is rocked in a counterclockwise direction by cam 130. This positive movement is transmitted by pin 133 to armature latch 111, moving the latch away from the magnet and bringing its latching shoulder beneath the shoulder 112 on slide 105, thus latching the slide in the normal position for subtraction.

The subtraction mechanism may be disabled or suppressed if it is desired to use the machine for ordinary adding operation. With the machine set for addition the two accumulators illustrated in Fig. 4 may be used as two ordinary adding counters. An example of the operation of the two counters under such conditions is illustrated by the last five lines listed in Fig. 13. A means is provided for setting the machine for ordinary adding control or subtraction operation. In Fig. 1 the subtraction setting lever 135 is shown as it protrudes from the machine in a position handy for adjustment by the operator of the machine. The lower full lined position of the lever is the subtraction control position. When the lever is raised to the dotted line position the machine is set for adding operation. The lever is pivoted at 136 and is provided with an arm 137 connected by a link 138 to a neutralizing latch lever 139 (see also Fig. 11). This lever 139 is pivoted at 140 and has, at the end of its lower arm, a latching shoulder 141 adapted to cooperate with a shoulder 142 on the slide 105. In the subtraction selection position of lever 139, as shown in Fig. 11, shoulder 141 is held out of the path of shoulder 142 on slide 105, thus permitting free movement of the slide to position stud 102 during debit item entering. When lever 135 (Fig. 1) is moved to the dotted line position for adding control, the movement is transmitted through link 138 to lever 139 and the lever is placed in a position wherein shoulder 141 obstructs the downward movement of slide 105. At the same time a pin 143 on link 138 rocks an arm 144 loosely pivoted on the stud 114. There is also pivoted on the stud 114, a latch disabling lever 145 having a stop stud 146 contacting the side of arm 144.

The lever 145 and arm 144 are normally held together with stud 146 against arm 144 by means of a tension spring 147 connected between the arm and the lever. The lower end of lever 145 is provided with a pin 148 adapted to cooperate with the side of armature latch 111. When link 138 is moved to the left (Fig. 11) by the adjustment of lever 135 (Fig. 1) for adding operation, arm 144 is rocked to tension spring 147, and lever 139 is rocked to place shoulder 141 beneath shoulder 142. Spring 147 serves to hold the latch 111 disengaged from shoulder 112 while lever 145 is positioned for ordinary adding operation. The spring is tensioned for an instant when lever 131 is positively rocked by its cam 130. When lever 145 acts, under the tension of spring 147, it disengages the latch 111 from shoulder 112 on slide 105. The slide is drawn down by spring 110 until shoulder 142 is in contact with the horizontal face of shoulder 141 on lever 139. The slide is then in what may be termed a neutral position. When the slide is in this position both of the studs 101 and 102 are out of the path of movement of the ends of levers 95 and 96. The ends of the studs and levers are shaped to provide clearance between each stud and lever. With both of the studs 101 and 102 out of coupling or motion transmitting position, the rocking movements of levers 90 and 91 are idle movements, and arms 97 and 98 are not disturbed. The shaft 92 to which arms 97 and 98 are attached remains in addition selecting position thus holding shaft 78 and the attached crank arm 77 in position for adding. The effect produced by leaving arm 77 in the addition selecting position has been described hereinbefore in connection with the description of the subtraction mechanism in Fig. 4.

During ordinary adding control the slide 105 is lifted by lever 124 in the usual way near the end of each operation. However, since latch 111 is tripped by lever 145, slide 105 is not latched in the upper position but is allowed to move back to the central neutral position.

In the subtraction control position of the lever 145 (Fig. 11) pin 148 does not interfere with the latching and unlatching of armature 111 under control of lever 131 and magnet SM2.

*Accumulator carrying mechanisms*

For effecting carrying or transferring from one order to the next higher order in an accumulator a brush 149 (Figs. 4 and 8) fixed to an arm 150 pivoted at 151 is adapted to cooperate with either of two projections 152 on a contact disk 153 mounted on stud 11 and fixed to constantly rotating gears 10 and 29. Another brush 162 on lever 150 is positioned to cooperate with other projections 163 (Fig. 7) on disk 153 in a plane adjacent to the position of projections 152 on the disk. When an accumulator wheel 38 (Fig. 4) of a given order passes from its nine position to its zero position, a projection 154 (see Figs. 7 and 8) on a disk 155 fixed with respect to the gear 38 will engage a projection 156 on the arm 150 and rock the arm into the position of Fig. 8. The latching pawl 157 will then cooperate with a projection 158 (see Fig. 8) on the arm 150 and latch the arm in this position so that the brush 149 will be in position to make contact with the segmental projection 152 when the latter, which is constantly rotating, passes the brush.

This contacting of brush 149 with projection 152 will take place soon after the projection 51 (Fig. 4) associated with the accumulator wheel of the next higher order has engaged the arm 53 and cammed the gear 30 out of mesh with gear 29. The contacting of brush 149 with projection 152 will supply current through disk 153, to the contact brush 159 touching disk 153 during the transferring, and then to the magnet C or D of the adding unit of the next higher order. Gear 30 will reengage and turn gear 38 one more step and then be cammed out by cam point 52. If the value standing in the wheel of any accumulator unit happens to be nine when one is added to that order causing the adding wheel to pass from the nine position to the zero position, it will be necessary to continue the carrying on to the accumulator unit of the next higher order.

In order that this may be effected when the wheel 38 of any order stands at the nine position, its disk 155 will present a depression 160 to the arm 156 as in Fig. 7, permitting the arm to be rocked counterclockwise by its spring 161 (Fig. 4) into the position of Fig. 7, rocking the brush 162 also carried by the arm 150 into position to be engaged by one of the projections 163 also on the disk 153.

The brushes 149 and 162 are insulated from each other and current is supplied to them through separate wires but both brushes are adapted to carry current to the disk 153 and through the contact brush 159 to the counter magnet C or D of the next higher order. The projection 163 engages the brush 162 at the same time that the projection 152 is adapted to engage its brush 149. Thus if the accumulator wheel of a given order passes to zero position and supplies current to the brush of the accumulator unit of the next higher order, if the latter unit contains the value nine it, besides being caused to accumulate an additional one by reason of the position of the brush 149 in the unit of the next lower order, will supply current through its brush 162 to the unit of the next higher order to carry one thereto.

Of course, if the cam disk 155 of a given order is standing in its nine position, as in Fig. 7, as soon as one is added to this order, the cam disk 155 will turn one more step to the position of Fig. 8. This will rock the brush arm 150 to the position shown in Fig. 8 but current will already have been supplied through brush 162 to perform the carrying function in the next order. The rocking of the arm 150 to this position to cause the brush 149 to be engaged by a projection 152 will have taken place too late to effect the carry in the next higher order. It is for this reason that the brush 162 is provided. The rocking of the brush 149 to this position thus has no effect and it will be restored to normal position before the next projection 152 reaches it.

After the brush arm 150 has been rocked to the position of Fig. 8 and latched by the pawl 157 and after the projection 152 has passed the brush 149, the arm 150 is released by a cam 164 (Figs. 4, 8 and 15) which is secured to the constantly rotating gear 10. The cam engages the inner projection 165 of the latching pawl arm which is pivoted at 166, rocking the pawl against the action of its spring 167, (Fig. 4) and releasing the arm 150 to permit its spring 161 to rock it counterclockwise until the projection 156 engages the periphery of the disk 155. The arm 150 will then be in such a position that neither brush 149 nor brush 162 will make contact with the disk 153.

The energization of the units order magnet at the ten rather than the nine position during complement addition has been mentioned before in this specification. The extra unit thus gained fills out the complement to the true tens complement of the number being subtracted. If the number represented on a record card contains a zero in the units order, the rotation of the units order wheel through ten steps of movement will actuate the carrying mechanism to induce a carry into the higher order wheel thus automatically carrying the extra unit to the higher orders to fill out the complement.

Printing mechanism

The printing mechanism which is shown in greater detail in my copending application Serial No. 442,348, includes a platen 168 (Fig. 2) and a series of type carriers 169 each having a plurality of type elements 170 adapted to be struck by a hammer 171 loose on a rod 172. An upper and a lower zero type element 170 are included in the eleven type on the carrier. The type carrier is connected at its lower end to an arm 173 fulcrumed at 174. Springs 175 connected to the arm 173 and to a cross beam 176 connected between arms 177 pivoted at 178 tend to raise the arm 173 to raise the type carriers. A restoring bail 179 connected by links 180 to arms 177 is adapted to restore the arms 173 to their lower or normal position. An arm 181 (Fig. 1) fixed to the shaft 178 on which the arms 177 are also fixed is connected by a link 182 to a complementary cam follower arm 183 pivoted at 184 and cooperating with cams 185 and 186 on cam shaft 187.

Shaft 187 is driven through a chain of gears 188, 189 and 190 the latter of which is mounted on shaft 23. The shaft 23 turns synchronously with the feeding of the cards through the machine and the bail 179 (Fig. 2) is thus raised so as to permit the type carrier to rise synchronously with the feeding of the card. Thus when the type element 170 carrying the numeral nine is approaching the printing line with respect to platen 168 and the actuating hammer 171, the nine position on the card will be passing the reading brushes 5.

If there is a hole at the nine position, a circuit will be closed through the brush 5 to the printing magnet P (Fig. 2) of that particular column. This will attract the associated armature 191 which is connected to one of the rods 192 which at the other end is connected to the latching member 193 of the particular column. This will release the latching pawl 194 permitting it to cooperate with the ratchet teeth 195 carried by the type carrier to stop the type carrier with the nine type in line for printing. When the arms 177 raise the bail 179 to permit the type carriers to rise, the springs 175 will be tensioned so as to raise the arm 173 of the type carrier. After printing has been effected, the arms 177 are then lowered with the bail 179 to restore the type carriers to normal position.

The latching pawls 194 must then be restored before the type bars can begin their next upward movement. For this purpose a bail 196 is adapted, when rocked clockwise, to rock the latching pawl 194 counterclockwise against the action of its spring and permit it to be latched by the latch 193. The bail 196 is connected by links 197 to arms 198 fixed on shaft 199 on which is also fixed an arm 200 (Fig. 1) connected by link 201 to an arm 202 pivoted at 203 and connected to a cam follower arm 204 (Fig. 2) adapted to be actuated by a cam 205 on shaft 187.

The several type actuating hammers 171 are actuated by individual springs 206 tending to rock them against the type 170 to effect printing. The hammers are normally locked in their inoperative position by individual latches 207. These latches are connected to arm 208 adapted to be moved to the left by a bar 209 when the rising of the particular type carrier 169 permits the arm 208 to rock counterclockwise into position to be actuated by the bar 209.

The bar or bail 209 is pivoted at 210 and is connected to an arm 211 (Fig. 1) connected by a link 212 to a bell crank 213 in turn connected by a link 214 to an arm 215 fixed at 216 to a shaft which carries (see Fig. 2) a cam follower arm 217 having rollers 218 cooperating with complementary cams 219 mounted on shaft 187. The bail 220 which restores the hammers to normal position is supported on a pair of arms fixed on the shaft 172 to the end of which is fixed the arm 213 (Fig. 1). The pin and slot connection 221 between link 212 and arm 211 permits the shaft 172 to turn clockwise a slight amount without link 212 moving arm 211, in order that bail 220 (Fig. 2) may be moved out of the way of the hammers 171 before the arm 211 and bail 209 are actuated by link 212 to release the hammers.

Where listing is to be effected on a listing sheet 222, as in Fig. 14, while the data is also being accumulated, the printing magnet P will be connected to receive an impulse through the perforation in the card simultaneously with the transmission of such impulse to the accumulator magnet C or magnet D. The amount may be listed whether the item is a debit or a credit. As shown in Fig. 14 minus signs may be printed adjacent certain of the items to identify them as debit items. An asterisk may be printed adjacent the sub-totals as shown. Another sign may be used to identify clearing or reading totals.

Total taking devices

When a total is to be taken of a group of items which have been accumulated, it is necessary to open certain listing circuits and close certain total printing circuits. The mechanism for effecting these circuit changes is shown in Fig. 3 in which a magnet TSM is adapted to be energized whenever a total is to be taken. Suspended from the machine base 223 is a pair of brackets 224 supporting a series of contacts arranged in tiers for compactness, each of which comprises an upper blade 225, a center blade 226 and a lower blade 227.

Cooperating with these fixed blades are blades 228 and 229 mounted on insulated bars which are secured to rectangular bars the ends of which are attached to vertical side plates 230 (Figs. 1 and 2). The side plates 230 are supported by arms 231 secured to shafts 232 journalled in brackets 224. A spring 233 (Fig. 1) attached to an arm 234 on one end of shaft 232 tends to urge plates 230 down from their normal, or listing position, wherein the blades 225 and 228 are in contact with each other. At the other end of shaft 232 arm 231 (Fig. 3) carries a link 235 which forms a toggle connection with a link 236 pivoted at 237. This toggle connection is held with its common connecting point slightly to the left of dead center, as shown in Fig. 3, by the action of spring 233. An adjustable stop 238 limits the movement of the parts to the left. Energization of magnet TSM attracts its armature 239 rocking it about its pivot 240 to unlatch a hammer 241 which under action of spring 242 strikes the toggle at its connecting point and moves it sufficiently to the right of dead center to allow spring 233 (Fig. 1) to further move the parts to total taking position.

A double armed lever 243 (Fig. 3) secured to shaft 232 and having a roller 244 moves to engage its cam 245 on continually running shaft 19 immediately upon breakage of toggle 235, 236 permitting a link 246 to rock a latch 247 against spring 248 and out of engagement with the toe of an arm 249 fast to a rock shaft 250. Link 246 also, through bell crank 251 actuates link 252 (Fig. 2) to cause additional paper spacing. The aforementioned hammer tripping takes place at a time when cam 253 secured to continually running shaft 19 is about to present the descending portion 254 to a roller 255 mounted on an arm 256 loosely pivoted on shaft 232. The roller is normally held out of engagement with cam 253 by latch 247 holding arm 249, link 257 and arm 256 in a lowered position, (Fig. 3) but it engages the cam when latch 247 is operated. As roller 255 follows the periphery 254 of cam 253 it permits shaft 250 to rock clockwise (in Fig. 3) through link 257 attached to arm 249 since latch 247 is then out of cooperation therewith. Continued rotation of shaft 19 causes a cam 258 to cooperate with a bell crank lever 259 loose upon shaft 232 and held against cam 258 by spring 260. At such a time cam 245 has restored shaft 232 to almost normal position from which roller 261 on lever 259 moves toggle 235, 236 across dead center and against stop 238.

A roller 262 strikes finger 263 integral with hammer 241 to restore the same. In Fig. 1 it is noted that shaft 250 has connections to a similar shaft 264 through link 265 and arms 266 so that both shafts operate together. These shafts extend across the accumulating sections of the machine and have a groove 267 cooperating with the ends 268 of levers 269 (see Figs. 4, 5 and 6) pivoted at 270 on the accumulator unit plates 7. At the right end of lever 269 is a link 271 having a pin and slot connection 272 (Fig. 4) with the lever. With the parts in the position shown in Figs. 4, 5 and 6, link 271 is held in its raised position. But during totaling with shaft 264 rocked into the dotted line position 273 (Fig. 5) the lever 269 is released for clockwise movement and link 271 is lowered.

Resting in slots 274 in link 271 are screw-headed pins 275 on the free ends of horizontal arms 43 pivoted at 276 and 276'. The arm 43 associated with the credit accumulator is shown in Fig. 6, and the debit accumulator arm 43 is shown in Fig. 4. The arms are similar in construction and operation, a description of one applies to the other. Also on the free end of each arm 43 is a fulcrum block 44 (Fig. 4) in contact with the under side of spring 39. When the parts of the accumulator are in normal position for item entering as in Fig. 4 the arms 43 are held in raised position by vertical link 271 which in turn is supported by lever 269 and shaft 264. Underneath a projection 277 on arm 43 but normally out of contact therewith is a latch 278 on the lower end of arm 279 pivoted at 280. Integral with arm 279 is an upwardly extending arm 281 (Fig. 6) having its free end in the path of cam 282 fast to accumulator gear 38 (Fig. 15). From the periphery of cam 282 there extends four cam projections one of which is adapted to engage and operate latch 278 when the accumulator wheel stands at zero (Fig. 6).

While arm 43 (Fig. 4) is held in the normal item entering position by link 271, the free end of spring 39 is pressed upwardly by fulcrum 44 and serves, as already explained, to swing the assembly 33, 34 in counterclockwise direction to carry out the adding operation. With the parts in totaling position, shaft 264 is turned and the arm 43 is released by link 271 but is held in raised position by the engagement of its lateral projection 277 with latch 278 (i. e. when the wheel stands in a position other than zero position). When the wheel is rotated during total taking and arrives at the zero position, arm 281 is raised by cam 282 (Fig. 6) latch 278 is withdrawn from underneath block 277 on lever 43 which thereupon drops sufficiently to release pressure of fulcrum 44 on spring 39 which then swings with stud 41 as a fulcrum and rotates the assembly 33, 34 clockwise instead of counterclockwise.

In other words, spring 39 tends to rotate the assembly 33, 34 in one direction when fulcrum 44 is elevated and in the other direction when the fulcrum is lowered. This by reason of the fact that with fulcrum 44 released, spring 39 bears down upon fulcrum 44 which in turn bears upon arm 283 (Fig. 4) of lever 33 on assembly 33, 34 with greater turning effort than is exerted, in the opposite direction by the end 42 of spring 39 at the point where the spring fits in a slot in lever 33. This action, as will be explained, takes place to declutch the counter wheel from the driving means when the wheel reaches the zero position during the total taking operation.

The total printing devices include a commutator 284 (Figs. 4 and 5) of insulating material with four metallic inserts 285 in its rim. The commutator is fast to transfer cam 155 and gear 38 as may be seen in Fig. 15. Since the accumulator gear 38 makes one complete revolution for four adding movements of ten steps each, the commutator has four zero positions. Bearing on the rim of each commutator are two brushes 286 so located so that when the commutator is in a zero position both of the brushes are on an insert 285. The circuit including the brushes is opened by the gap between the brushes and closed by the inserts 285.

Referring to Figs. 5 and 17 it may be seen that a series of brushes 286 cooperate with the commutators 284 on the upper credit accumulator wheels, and another series of brushes 287 cooperate with the wheels in the lower debit accumulator.

Other totaling brushes 288 (Fig. 17) are provided for the purpose of testing whether the total to be printed is a negative or positive balance. These brushes 288 are similar in construction and operation to the brushes 286 and 287 the difference being that brushes 288 are in a different circuit and the accumulator wheel with which they cooperate is the highest order wheel in the credit accumulator. Another difference is that brushes 288 are set to close the circuit through them when the wheel they contact stands at 9. This circuit is used for controlling the printing of a total where the amounts added and subtracted yield a negative balance. That is, where the sum of the various amounts subtracted is greater than the sum of the various amounts added in the machine.

It may be assumed that the capacity of the credit accumulator is one order less than the number of orders provided. The highest order is reserved for testing for complements.

Where the total is a positive total, the highest order wheel in the credit accumulator will contain a zero, therefore the gap between brushes 288 will remain open and the circuits leading from the upper brushes 286 to the printing magnets P will remain closed so that a total representing a positive balance will be printed under control of the credit accumulator. Where the total is a negative total, the highest order wheel in the credit accumulator will contain a nine therefore the circuit through brushes 288 will be closed, thus energizing a minus balance magnet MBM (Fig. 17) which shifts certain total control contacts so that the lower brushes 287 are connected to the printing magnets P and a total representing a negative balance will be printed under control of the debit accumulator.

When it is desired to take a total, magnet TSM is energized to rock shafts 232 and also shift the contacts described in connection with Fig. 3. Referring now to Fig. 17, contacts TS1, TS2 and TS6 are also closed at this time, one of their blades being fixedly mounted, and the other movable, having such relationship as blades 227 and 229 already described.

A pair of make and break cam contacts CR7 and CR11 are arranged to operate to transmit an impulse through the total taking or cancelling circuit at the ten index position in the cycle, i. e., at an instant corresponding substantially to a time one point in advance of the instant that the 9 position on a card passes the sensing brushes during item entering operations. These cams are mounted on a continually operating shaft driven by gear connections to the continually running shaft 23' (Fig. 1). The cancelling circuit has connections to the counter magnets C and D of both accumulators through which impulses are sent at the ten index position in a manner more fully described hereinafter.

This energization of magnets C and D early in the total taking operation engages for rotation all the credit or debit counter wheels for restoration to the zero position. In Fig. 6 the parts are positioned as they appear when the counter wheel reaches the zero position during total taking. It is seen that lever 281 is rocked clockwise by a projection on cam 282, thus withdrawing latch 278 from under projection 277 on arm 43 which then may drop since it is not supported by link 271 during total taking. As arm 43 lowers under the pressure of spring 39 on fulcrum block 44, the lower edge of the block strikes the upper edge of the arm 283 and urges the frame 34 in a clockwise direction to disconnect the counter wheel from the driving gear and leave it at zero.

During the rotation of the counter wheels in total taking the type bars are rising in synchronism with the movement of the wheels, which in this instance may be considered to be the commutators 284. The motion of each type bar is arrested by a mechanism (Fig. 2) controlled by an impulse through a printer magnet P at the time the connected circuit is closed by an insert 285 bridging the gap between the totaling brushes when the related counter wheel arrives at zero. Thus the counter wheel will rotate with one of the commutator inserts 285 approaching the totaling brushes until at zero the insert closes the circuit to send an impulse through the printer magnet in the same differentially timed manner that a perforation in a record card column closes a circuit to the printer magnet in item printing. Simultaneous with total printing and the arrival of commutator 284 at zero position, cam 282 rocks arm 279 releasing frame 33, 34 which is rocked clockwise by spring 39 to throw the counter driving elements out of operative engagement, leaving the counter wheel in a reset or zero position, in a manner already described in connection with Fig. 6.

The progressive totaling devices

For certain classes of accounting work it is desirable to be able to secure a printed record of the total or balance of a group of items entered into an accumulator without resetting the accumulator wheels to zero. This is known as taking a progressive, sub, or running total. The amount registered by the accumulator wheels after the taking of such a total is the same as the amount they registered before the totaling operation was performed. An example of a progressive totaling operation is shown in Fig. 14. There it is noted that after the accumulation of the first four items a printed record of the negative balance 54 is made without resetting the accumulator wheels in counters C or D (Fig. 13). The debit balance 54 is then retained as an old balance and accumulated with a subsequent set of items, the result being a positive balance of 165.

The secure progressive totaling control in the machine illustrated, the gear clutching frame 33, 34 is prevented from going out of mesh with the driver gear at zero during total taking.

In Figs. 4 and 6 it is noted that to the right of each counter magnet C and D there is positioned a magnet PG supported by a bracket 289 fastened to plate 7. These magnets PG are energized during total taking when a progressive total is desired. The armature 290 of the magnet is pivoted at 291 and at its lower end is pivotally connected at 292 to a slide 293. A spring 294 connected between a tab on slide 293 and a stud on plate 7 normally holds the slide to the right and the armature away from magnet PG. The lower forward end 295 of slide 293 is sheathed in a fixed slotted stud 296 on plate 7. When magnet PG is energized armature 290 is urged in a clockwise direction and pushes slide 293 before it until the end 295 protrudes beyond the left side of stud 296 and projects into the path of a projection 297 on the arm 43.

During the taking of ordinary clearing or zeroizing totals, the projection 297 is not obstructed by end 295, therefore when the counter wheel reaches zero position (Fig. 6), arm 43 is free to descend, and spring 39 pressing fulcrum block 44 down on arm 283 serves to rock frame 33, 34 disengaging gear 30. Thus, during the taking of a total, the counter wheels are restored to zero position.

If, however, a progressive total is desired, connections are made to energize the magnets PG during total taking. The projection 297 will then be obstructed by end 295 so that when arm 43 is released by latch 278 at zero, the arm will not descend but fulcrum block 44 will continue to support the spring 39 to hold the gear frame 33, 34 with gear 30 in mesh with gear 29. The accumulator wheel will continue to rotate after passing the zero position, for the entire movement of ten steps bringing it into a position similar to the position it occupied before total taking. The gear 30 is disengaged by cam face 51 on cam 50 striking arm 53 of frame 33, 34 to positively restore the frame with arm 45 under armature 46.

As may be noted from Fig. 17 each counter magnet C and D has an associated progressive total magnet PG.

Each magnet PG is provided with a separate plug connector 298 (Fig. 17) for making the connection necessary to put the magnet in the circuit energized during total taking. By connecting all the wires 298 both accumulators are adapted to provide progressive totals. If desired, the wires 298 forming connections to the magnets PG in one counter may be disconnected, thus adapting the said counter to take clearing totals while the other counter takes progressive totals. A counter may be split into two or more sections for total taking, certain sections taking clearing totals and other sections taking progressive totals, by merely disconnecting the wires 298 of certain orders in the counter.

Group control

In this art the record cards are usually grouped according to transactions or commodities or salesmen. In such case the cards of each group are given a special designation which usually takes the form of a number perforated in certain columns on the card. This number is utilized to control the stopping or other operations of the machine so that when the last card of a group passes through the machine, the machine may be caused to stop or to take a total of the group. The printed list in Fig. 14 shows the operations performed by two groups of cards.

The subtraction magnet

Figure 12:
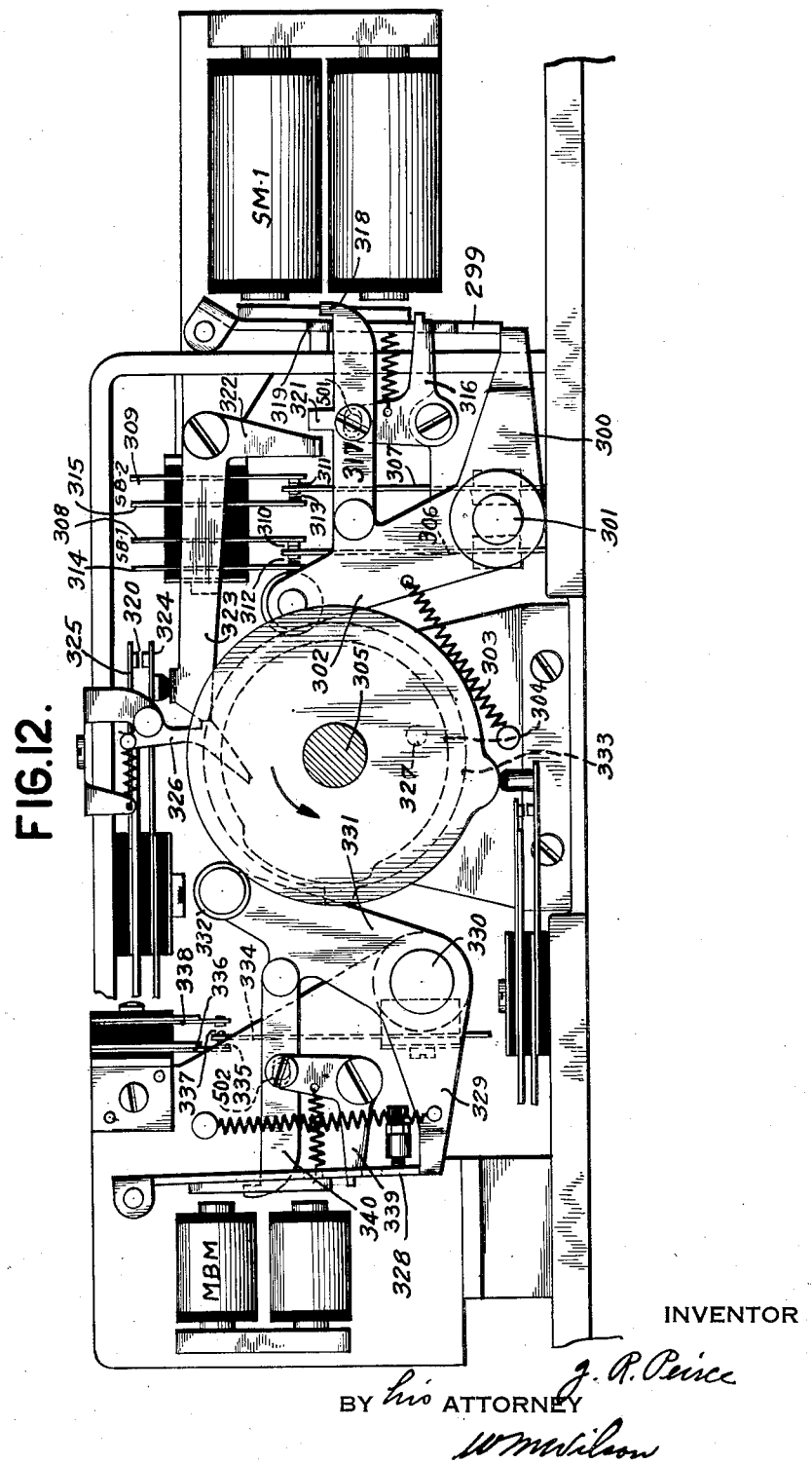
Fig. 12 is a view of the subtraction contact controlling devices.

The magnet SM1 shown in Fig. 12 is used for controlling the machine when subtracting is to be effected. This is the magnet which is energized when a perforation 2 is found above one of the columns on the record card 1 of Fig. 9. When this magnet is energized it will attract its armature 299 releasing a lever 300 fixed on shaft 301 so that an arm 302 of the lever may be caused by its spring 303 to follow a cam 304 fixed on a shaft 305. The rise on the cam 304 is arranged to support the released lever 300 until the proper time when the cam releases the lever and allows it to rock counterclockwise. Contact blades 306 and 307 fixed to the shaft 301 will then be rocked from the position shown with blades 306, 307 contacting fixed blades 308, 309 to open contacts 310 and 311 and close contacts 312 and 313 to blades 314 and 315.

There are several of these sets of contacts the functioning of which will be described in connection with the showing in Fig. 17. The restoration of the contacts to normal position will be effected by the cam 304 which rocks the follower arm 302 to restore arm 300 where it will again be latched by armature latch 299.

A latch 316 may be provided to hold the armature 299 after it is attracted and until shaft 301 is rocked counterclockwise when the roller in arm 302 drops off the rise on cam 304. When the shaft rocks, the latch 316 will be lifted by the link 317 to which it is loosely connected by the screw and slot 501. At the same time a hook 318 will engage a projection 319 on the armature and pull the latter away from the magnet cores to create an air gap so that when the arm 300 is later lowered to its normal position the armature will not be prevented by residual magnetism from moving quickly into position to latch the arm down.

When the subtraction contact shaft 301 is rocked a contact 320 in the minus sign printing circuit is closed. A projection 321 on link 317 rocks a bell crank lever 322 when arm 302 is rocked to the left. The horizontal arm 323 of lever 322 then lifts a contact blade 324 into contact with a fixed blade 325. A latch 326 holds the arm 323 up with contacts 320 closed until a pin 327 on cam 304 strikes the end of the latch releasing the arm and opening the contacts. The position of contacts 320 in the circuit is shown in Fig. 17.

The minus balance magnet

The minus balance magnet MBM and the various contacts controlled by it are shown in Fig. 12. When taking a total, if a nine is registered on the highest order credit wheel 284 (Fig. 17), a circuit through brushes 288 is completed and magnet MBM is energized. The armature 328 of magnet MBM, when attracted, releases a lever 329 fixed on shaft 330. Another arm 331 of lever 329 has a roller 332 positioned to cooperate with a restoring cam 333 on shaft 305. Fixed to the shaft 330 is a contact blade 334 normally closing a contact 335 with a fixed blade 336.

When lever 329 is released and shaft 330 is rocked, blade 334 opens the contact 335 and closes another contact 337 with a fixed blade 338. The minus balance lever 329 is provided with a latch 339 and link 340 loosely connected together by a screw and slot connection 502. The latch 339 holds the armature 328 in attracted position until lever 329 moves, then the latch is lifted and link 340 pulls the armature out of attracted position. The control exercised by the minus balance contacts will be described in connection with the wiring diagram in Fig. 17.

Machine operating connections

The wiring diagram in Fig. 17 shows the control of the machine for effecting adding, subtracting, printing, card feeding and totaling. Only so much of the control as is necessary to understand the operation of the present invention is included in this diagram as the complete control wiring diagram would be so much more complicated that it would not be so readily understood without an unnecessary amount of study.

The source of power is at PS and includes the lines 341 and 342. When a switch at PS is closed the operating motor of the machine is energized and will operate connected parts to which the various mechanisms in the machine may be clutched.

When the start key 343 is depressed contacts K1 and K2 will be closed. This will close a circuit from the line 341 through conductor 344, contacts K2, wire 345, card feed clutch magnet CFM, wire 353, contacts K1 now closed, stop key contacts K3 normally closed, wires 346, 347 to the line 342. The energization of magnet CFM will cause operation of the card feed mechanism to feed cards through the machine. This magnet also controls the contacts CFC1, closing them when the magnet is energized. As the cards commence feeding through the machine they will depress the upper card lever UCL, closing contacts 348, 349 and opening contacts 350. The start key 343 may then be released and the circuit through the magnet CFM will be maintained from line 341, through wire 344, wire 351, contacts 349, contacts 348, wire 352, wire 345, magnet CFM, wire 353, contacts CFC1, contacts K3, wires 346 and 347 to line 342.

Between the passage of the cards the card lever UCL is released so that contacts 348, 349 open and contacts 350 become closed. During this interval the CF1 cam permits its contacts to be closed so that the current will flow around the contacts 348 and 349 at this time and thus continue the circuit. While the cards are holding the contacts 348 and 349 closed the CF1 contacts are held open by their cam. If cards fail to feed the circuit will be broken, deenergizing the card feed clutch magnet and thus stopping the card feed mechanism.

If printing is to be effected under control of the cards being fed through the machine the switch S4 will be closed so that when the start key 343 is depressed a circuit will also be established through the printing clutch magnet PCM. This circuit is as follows: from the line 341, through wire 354, printing clutch magnet PCM, through switch S4, contacts LCL1 as soon as the LCL card lever is closed by the cards that are now being fed through the machine, contacts K1, contacts K3, wires 346 and 347 to line 342.

The energization of magnet PCM causes the printing operating devices to be clutched to the main operating mechanism so that type bars and associated mechanism are operated. After the start key is released the circuit continues through the contacts CFC1. If cards fail to feed the LCL card lever will permit its contacts to open, breaking the circuit through the magnet PCM. The stoppage of the card feed mechanism by deenergization of magnet CFM also causes opening of the contacts CFC1 so that the circuit is broken at two points. When the total key is pressed to take a total, contacts TS6 will close under control of magnet TSM to reenergize the printer clutch magnet PCM through wire 355 so that the total may be printed.

While the machine is in operation and cards are being fed the machine may be stopped at any time by depression of the stop key 356 to open the contacts K3. This will break the circuit through the card feed clutch magnet and the printing clutch magnet. The operating motor will, of course, continue to operate until the switch at PS is opened.

A platen feed mechanism is provided to feed the record paper before printing in both listing and total operations. A platen feed magnet PFM, when energized acts to clutch the platen spacer to the driving mechanism. The circuit through the platen feed magnet is as follows: line 341, wire 357, contacts PM3 closed before printing, magnet PFM, and wire 358 to the other line 342.

A number of circuit closing contacts shown in Fig. 17 are operated by certain parts of the machine depending upon whether the contacts are to be operated during a card feeding cycle or during a totaling cycle of the machine when feeding is not being effected. The contacts and cams that are operated during the card feeding cycle of the machine when the machine is either adding or subtracting, during which operation listing of the amounts added and subtracted may also be effected, are designated CF cams and contacts. All of the CF cams may be mounted on the shaft 359 of Fig. 1 which shaft is operated when cards are being fed through the machine.

Other cams and contacts are designated as CR cams and contacts. These cams are continuously operating whether the machine is adding, subtracting or totaling. These cams may be mounted for operation on shaft 19 (Fig. 2) which shaft is always turning. Certain contacts not operated by cams and designated TS contacts may be normally opened or normally closed and are controlled by plates 230 (Figs. 1, 2 and 3). When the machine goes into a totaling operation magnet TSM is energized to shift the parts so that the open TS contacts become closed and those that are closed become opened. Certain contacts are adapted to be opened or closed when the subtraction magnet SM1 is energized. Other contacts are effected when the minus balance magnet MBM is energized.

*Accumulating and listing*

When cards are fed through the machine they first pass under the upper brushes 4 at UB (Fig. 17) and then under the lower brushes 5 at LB. While a card is under the brushes 5 the contacts CF3 are permitted to close because the spring contact blade falls into a depression in a card feed cam. If a perforation appears in any column on the card, when such perforation passes under a brush 5 a circuit will be set up through the perforation as follows if the card is a credit card: from line 341, through the LCL2 contacts which are held closed by the cards while cards are feeding, through contacts CF3 and through the brush 362 to the common contactor 363, then through the perforation in the card to the brush 5, to plug socket J1, through a plugging wire to the socket J3, to contacts PBC now closed, through cable 364, through contacts 311, magnet C, to bus bar 365, and through wire 366 to the other side of the line 342.

During the same cycle in which the credit counter magnet C is energized by an impulse through brush 5 during credit item entering, the related debit counter magnet D is energized early in the operating cycle to start accumulating the complement of the credit amount. The circuit for energizing the magnets D is: line 341, contacts LCL2, wire 367, contacts CFC3 now closed, and then through two branches of the circuit; the one closed by contacts CR9 sends an impulse through wire 368 to the higher order magnets D at a time corresponding to the 9 position on the card, the other closed by contacts CR10 sends an impulse through wire 369 to the units order magnet D at a time when the 9 position on the card is one step above the brush 5, thus enabling the units wheel to turn through ten steps of movement. The circuit continues through contacts 310, through magnets D, bus bar 365, and wire 366 to line 342. Each debit counter wheel will continue to rotate until the related credit magnet C is energized. When the credit wheel clutching frame 33, 34 moves to connect the credit wheel with its driver, the related debit clutching frame will disengage the debit counter wheel from its driver by means of the mechanism described with reference to Fig. 4.

The energization of magnet C as we have seen in connection with Figs. 4 and 15 causes the accumulator gear 38 to commence to turn in accumulating. It commences to turn at a point in the cycle when a perforation passes under the brush 5 and ceases to rotate when the cam point 51 (Fig. 4) causes the gear 30 to become disengaged from gear 29. Thus the amount represented by the position of the perforation is added in the upper credit wheel and, by means of the added complement, subtracted from the lower debit wheel.

The circuit through the brush 5 also effects printing through the following circuit: from the plug socket J3, through cable 370, through contacts 371 closed during listing, wire 372, through printing magnet P, to bus bar 373 and through wire 374 to the other side of the line 342. The energization of printing magnet P as described in connection with Fig. 2 controls the setting of the type carrier 169 to cause printing of the character represented by the position of the hole in the card.

Carrying from one order in an accumulator to the next higher order is effected as explained in connection with the mechanism shown in Figs. 7 and 8. The wiring connections are shown in Fig. 17. If the accumulator wheel of any order passes from nine to zero during an adding operation it will cause the brush 149 to rock into position to be later engaged by the projection 152 on disk 153 as described hereinbefore. After the accumulator wheel is disengaged the contacts CF7 (Fig. 17) are closed momentarily. This closure takes place at the moment when the projection 152 is passing the position of brush 149. If the brush has been rocked so as to be engaged by the projection, a circuit will be closed at this moment; the circuit includes the line 341, through wire 375, contacts CF7, then branching out to two bus bars, the one bus bar 376 being in the upper counter and the other bar 377 in the debit counter, through a brush 149, disk 153, brush 159, through wire 378 to magnet C of the next higher order or, if the carry occurs in the debit counter, through wire 379 to magnet D of the tens order, then to bus bar 365, and through wire 366 to the other side of the line 342.

As soon as one step of carry movement is imparted to one of the wheels, the cam point 52 (Fig. 4) will cam the pinion 30 out again so that the accumulator wheel again stops after having received the additional movement. If any accumulator wheel is standing at nine when a carry impulse is directed through the related magnet, the impulse is carried on to the next higher order. With a wheel at nine, the related brush 162 (Fig. 7) will be in position to be engaged by projection 163 on disk 153. This engagement also takes place during the moment that contacts CF7 (Fig. 17) are closed. Thus when current passes from the brush 159 to wire 378 it will also pass on to brush 162, through disk 153 of the next higher order, then to brush 159 of that order and out to the next wire 380, and on to the magnet C of the order above to cause one to be added to the hundreds order. In a similar way, a carrying impulse going through the tens order debit disk 153 passes through wire 381 to the hundreds order debit magnet D. Thus if the accumulator wheel of the tens order is standing at nine at the end of an accumulating operation and the wheel of the units order passes from nine to zero, a unit will be carried into the accumulator wheel of the tens order and another unit will be carried through the tens order into accumulator wheel of the hundreds order.

If the card carries a debit amount one of its columns will be perforated with a hole 2 in a position above the amount perforation positions. In the upper brushes (Fig. 17) the brush 382 which reads this particular column is connected by a plug line to the subtraction magnet SM1 which serves to set the devices so that the number on the card is added on the lower or debit accumulator while the complement of the number is added on the upper or credit accumulator shown in Fig. 4. Thus, if there is a perforation in this position, brush 382 will make contact with the common contact roller 383 and set up a circuit from the line 341, through wires 344 and 351, contacts 348 and 349 now closed, wire 384, subtraction magnet SM1, contacts CF5 closed while the brushes are passing the extra perforation, plug J6, plug wire (not shown), plug J5, brush 382, contact roller 383, brush 385, wire 386, and back to the line 342.

The energization of magnet SM1 serves to open the contacts 310 and 311 and close the contacts 312, 313, see Figs. 12 and 17. These contacts will remain in their changed position while the card is passing under the lower brushes 5. The changed relation of the 313 contacts directs the accumulating impulses from the card through the lower or debit accumulator. The closing of contacts 312 switches the impulses flowing through wires 368 and 369 to the credit counter magnets C which then start revolving early in the operation to add the complement. The credit counter wheels are disengaged from their drivers by the meshing of the debit counter wheels as explained hereinbefore. Since the units order wheel of either counter when adding a complement is adapted to rotate through ten steps of movement instead of nine, the complement received by the counter will be the full complement not merely the nines complement.

When the debit card is passing through the lower brushes the amount readings sensed by brushes 5 will be transmitted the same as credit amounts through plug socket J3 and through cable 364, but since contacts 311 are opened and contacts 313 are closed by magnet SM1, the impulses will be directed through magnets D, through bus bar 365 and wire 366 to the other side of the line 342. The printing of the debit amount is performed by energization of magnet P by impulses transmitted over the same circuits used in listing credit amounts.

The subtraction set-up magnet SM2 (Figs. 11 and 17) is also energized when an extra perforation 2 appears on a record card. The energization of magnet SM1 acts to close a contact 312 in series with magnet SM2, and serves to close the following circuit through the magnet SM2: from line 341, through wire 387, magnet SM2, contacts 312 closed, cam contacts CF9 closed late in the machine cycle, wire 388, and wires 389, 346 and 347 to the line 342. The effect produced by energizing magnet SM2 was fully described with reference to Fig. 11.

*Totaling operation*

To take a total, the total key 390 is depressed closing contacts K4 (Fig. 17). This energizes magnet TSM as soon as the CR1 contacts are closed. The circuit is from line 341, through wire 344, wire 351, contacts 350, contacts K4, magnet TSM, contacts CR1, wire 391, wires 389, 346 and 347 to the other side of the line 342. The contact blades 228 and 229 are then shifted by the mechanism shown in Fig. 3.

Contacts CR7 and CR11 are closed at a definite time after the shifting of contact blades 228, 229 and a circuit will be set up from the line 341 through wires 392 and 393, contacts TS2 now closed, contacts CR7 and CR11, plug socket CJ, a plug wire to the highest order jack J7 and through the blades 394 to blades 227 in all orders, through contacts 395 now closed, magnets C and D, bus bar 365, wire 366 and back to the line 342. This takes place at a time in the operation of the machine corresponding to one step prior to the time that the nine positions on the card would pass under the brushes 361. The accumulator wheels are then all (except the wheels at zero) thrown into mesh for operation and will be conditioned to turn through ten steps, or in other words each wheel will turn to add the value ten unless interrupted at an intermediate point. Although the cancelling or totaling impulses are sent through both accumulators printing will be effected only under control of the accumulator containing the balance as a true number. If the balance is a positive or credit balance, the following total printing circuit will also be closed while the accumulator wheels are turning: from the line 341, through wire 392, contacts TS1 now closed, contacts CR4 and CR5, and wire 396 to a brush in each pair of brushes 286.

The commutators 284 (Figs. 4, 5, and 6) are turning with the accumulator wheels. When a metal insert 285 on wheel 284 closes the circuit between a pair of brushes 286 the circuit will continue through cable 397, contacts 335, contacts 398 now closed, wire 372, printer magnet P, bus bar 373, wire 374, to line 342. The energization of magnets P will set the respective type bars for printing the total of the balance which was standing on the credit accumulator wheels. If set for a clearing total the accumulator wheels will be demeshed at the zero position, the grooved bar 264 of Figs. 4 and 5 having released the levers 43 to permit the gears 30 to be cammed and latched out so that the accumulators will be cleared and ready for a new accumulating operation.

As explained hereinbefore, if the amount standing in the accumulators is a minus balance, the credit accumulator will contain a complement and the debit accumulator will contain a true number as a balance. The accumulator wheel of the highest order in the credit accumulator will contain a nine and the corresponding debit wheel will stand at zero. Whenever a total is to be taken, the wheel 284 of the highest order in the credit accumulator is analyzed for a nine. If it contains a nine, devices are set up to print the total under control of the debit accumulator instead of the credit accumulator. After the total key 390 has been depressed and the contacts TS1 closed, current will pass from line 341 through wire 392, contacts TS1, wire 399, brush 288, insert 285, brush 288, wire 400, contacts CR6 now closed, wire 401, magnet MBM, wire 402 to line 342. This magnet MBM opens contacts 335 and closes contacts 337. Printing will then be directed by the rotating debit accumulator wheels. The debit counter wheels are conditioned for rotation by the cancelling circuit through plug socket CJ described before.

During clearing totals the wheels will rotate until they reach their zero positions at which time they will be demeshed and left at zero for a new accumulating operation. The circuit to the printer magnets P will be established on debit balance printing operations, from line 341, through wire 392, contact TS1, contacts CR4 and CR5, wire 402, brushes 287, cable 403, contacts 337, contacts 398, wire 372, printer magnet P, bus bar 373 and wire 374 to the other side of the line 342.

When it is desired to print the total without clearing the accumulator wheels, a switch S3 in a circuit with the progressive totaling magnets is closed. Then early in the totaling operation the magnets PG are energized by the following circuit: line 341, wire 392, wire 393, contacts TS2 now closed, wire 404, switch S3 closed, cam contacts CR2 closed during the total reading operation, common wire 405, magnets PG, plug wires 298, bus bar 365, wire 366 to line 342. The number of accumulator wheels retaining the amount setting after totaling, when switch S3 is closed, depends on the number of plug wires 298 connected to energize the associated progressive totaling magnets PG. An extra type bar is provided for printing plus or minus signs to identify the class of item or balance printed. The minus sign is printed adjacent debit items and negative balances. The circuit through the sign printing magnet PD (Fig. 17) is closed by the subtraction magnet SM1 during item entering and the minus balance magnet MBM during totaling. During item entering, if 320 is closed, see Fig. 12, the circuit is from line 341, through wire 357, contacts 406, contacts TS3 closed during item entering, switch S9 closed for sign printing, contacts 320, jack JK1, plug wire to jack JK2, magnet PD, bus bar 373 and wire 374 to line 342.

The type bar is latched by magnet PD in a position presenting the minus sign type to the printing hammer. When the machine is conditioned for totaling, contacts TS3 are opened breaking the circuit through contacts 320. Then if the total is a negative balance contacts 337 will be closed by magnet MBM and a circuit will be established from line 341, through wire 357, contacts 406, wire 407, contacts 337, jack JK1, plug wire, jack JK2, magnet PD, bar 373, wire 374 to line 342, thus stopping the type bar to print a minus sign. If both contacts 320 and 337 remain open during an operation of the machine, it indicates that the number printed is a credit item or a positive balance. To identify a credit item or balance a plus sign may be printed adjacent the number or the sign space may be left blank. When printing a plus sign the type bar is allowed to rise above the minus sign printing position until contacts 408 are closed by cam PM9 at the time the plus type is opposite the printing line. A circuit will be closed from line 341, through wire 357, contacts 408, wire 409, jack JK1, plug wire, jack JK2, magnet PD, bar 373, and wire 374 to line 342.

In order to print an asterisk as a total identifying sign, devices may be provided including an extra type bar holding the special type and a printing magnet for controlling the type bar when energized by a closed total circuit.

Since the basic novel features of the invention have been shown and described as applied to a single modification, it will be understood that various omissions and substitutions and changes in the form and details of the device illustrated and changes in its operation may be made by those skilled in the art without departing from the spirit of the invention. It is the intention, therefore, to be limited only as indicated by the scope of the following claims:

I claim:

1. In an accounting machine, a pair of adding wheels, a driving mechanism, a pair of devices for connecting the wheels with the driving mechanism, and an automatically operated means provided between the connecting devices for disconnecting one wheel when the other wheel is connected.

2. In an accounting device, a pair of accumulating wheels, driving means, means for connecting either wheel with the driving means, and means operated by said driving means for disconnecting either wheel under control of the connecting means of the other wheel.

3. In an accounting device, a pair of accumulating wheels of the same denominational order, driving means, means for connecting either wheel with the driving means, and means for disconnecting either wheel when the other wheel is connected during operation of the driving means.

4. In an accounting device, a pair of accumulating wheels, a driving means, a certain portion of the movement of which is adapted to actuate both wheels during a cycle of operation, means for connecting either wheel with the driving means at the beginning of the actuating movement, means for disconnecting the wheel and connecting the other wheel after the driving means has moved a differential amount, and means for disconnecting the other wheel at the end of the actuating movement.

5. In a machine of the class described, a pair of accumulating wheels, a driving means adapted to impart a certain amount of movement to the wheels during each operating cycle, means for engaging one wheel with the driving means at the beginning of the cycle, means for engaging the other wheel at a predetermined time to be driven for the remainder of the cycle, and means controlled by the engagement of the other wheel to disengage the one wheel at the predetermined time.

6. In an accounting device, two sets of accumulator wheels, driving means, means for engaging one set of wheels with the driving means at one stage of the operation, means for engaging the wheels of the other set with the driving means at different times, and connections between related wheels in the two sets for disengaging one wheel when the other is engaged.

7. In an accounting device, a pair of accumulator wheels, a driving means for imparting nine steps of movement to the wheels during a cycle of operation, means for dividing the nine steps of movement of the driver between the two wheels so that one receives a movement complemental to the extent of movement of the other, said means comprising means for selecting the wheel to receive the complemental movement, and means for disconnecting the wheel when the other wheel is connected for the remainder of the movement of the driving means.

8. In an accounting machine, a pair of accumulating wheels, driving means, means for connecting said wheels with the driving means, means for disconnecting said wheels at the end of the driving operation, devices for disconnecting either wheel during the driving operation, means for selectively conditioning said devices to disconnect one of the wheels, and means for releasing the selected device when the other wheel is connected.

9. In a machine of the class described, a pair of adding wheels, a driving mechanism, means for automatically engaging one of the wheels with the driving mechanism, means for controlling the amount of movement imparted to the wheel by the driving mechanism, devices under control of the last mentioned means for engaging the other wheel, and connections between the wheels for disengaging the one wheel when the other wheel is engaged.

10. In an accounting device, a pair of accumulating wheels, driving means, means for connecting either wheel with the driving means early in the operation, means for connecting the other wheel later in the operation, mechanism between the two connecting means tending to disconnect the wheel first connected, and means under the control of the second mentioned connecting means for releasing said mechanism.

11. In an accounting device, a pair of accumulating wheels, driving means, a device associated with each wheel for connecting it with the driving means, a linkage between said devices, and a tensioning means cooperating with said linkage for selectively urging either device to disconnect the associated wheel from the driving means when the other wheel is connected.

12. In an accounting machine, a pair of accumulating wheels, driving means, devices for connecting the wheels with the driving means, a linkage between said devices normally allowing the free connecting action of the devices, means for moving said linkage to disconnect either wheel when the linkage is released by connection of the other wheel.

13. In an accounting device, a pair of accumulating wheels, driving means, a device associated with each wheel for connecting it with the driving means, means for selectively controlling one of said devices to connect the associated wheel early in the operation, a linkage between said devices, a spring on said linkage under control of said selection means for urging the linkage to disconnect the connected wheel when the other wheel is connected at differential periods in the operation, and means cooperating with the device for the other wheel for connecting it to the driving means.

14. In an accounting machine, a pair of accumulating wheels, driving means, devices for connecting the wheels with the driving means in succession, the one to add a complement of a number and the other to add the true number, means for selecting one of the wheels for complemental addition, means for disconnecting the wheel selected, and control means enabling the operation of the device for connecting the unselected wheel to release said disconnecting means.

15. In an accounting machine, a pair of accumulating wheels, driving means, means for connecting said wheels with the driving means at the beginning of the operation, means for connecting said wheels with the driving means during the operation, devices for disconnecting either wheel during the operation, means for disconnecting the wheels at the end of the operation, means for selectively conditioning said devices to disconnect the wheel connected at the beginning of the operation, and means for releasing the selected device when the other wheel is connected during the operation of the driving means.

16. In an accounting device for obtaining the balance of debit and credit amounts, a wheel for adding credit amounts and complements of debit amounts, a wheel for adding debit amounts and complements of credit amounts, driving means, means for selectively connecting one of the wheels with the driving means to add the complement, means for connecting the other wheel to add the true amount, and means between the two connecting means for disconnecting the wheel receiving the complement when the other wheel is connected to receive the true amount.

17. In an accounting machine, a credit counter for accumulating credit amounts and the complements of debit amounts, a debit counter for accumulating debit amounts and the complements of credit amounts, means for actuating the counters, means for selecting a counter for accumulating the true amount according to the class of the amount, means for connecting the counter not selected to the actuating means to accumulate the complement of the amount, only one counter being actuated at a time, the unselected counter being disconnected when the selected counter is connected with the actuating means, and means for reading the balance registered on one of said counters.

18. An accounting machine comprising means for analyzing records bearing index points, accumulating devices and control means therefor comprising means for initiating operation of either one of said devices at a predetermined time and means controlled by the analyzing means for interrupting operation of the one device and initiating operation of the other device at differential times in accordance with index points to enter complements of items represented thereby into the one device, and additional means for interrupting operation of the other device after the entry of the true amount represented by the index points.

19. An accounting machine comprising means for analyzing records bearing index points, a pair of accumulating devices for adding numbers represented by the index points or complements thereof, control means for the devices to enter complements selectively therein comprising means for initiating operation of either of said devices at a predetermined time and means controlled by the analyzing means for interrupting operation of the device at differential times in accordance with index points to enter complements of items represented thereby into the accumulating devices, additional control means for said devices including means controlled by said analyzing means for initiating operation thereof at differential times in accordance with index points and means for interrupting operation of an accumulating device at a predetermined time to enter numbers represented by the index points into the device, and means controlled in accordance with classification index points on records for selectively placing one accumulating device under influence of the one control means and the other accumulating device under control of the additional control means.

20. In a machine of the class described, a pair of accumulators, an operating mechanism, devices for engaging the accumulators with the operating mechanism, links connecting said devices to a common oscillating member, a spring for urging said member in one direction or the other, means for releasing one of said devices to engage one of the accumulators, and means for releasing the other of said devices for engaging the other accumulator, the device in turn releasing said links which by means of said spring disengage the one accumulator.

21. In an accounting machine, a pair of accumulator wheels, driving means, separate clutching frames for connecting the wheels with the driving means, a pair of links connecting said frames to opposite sides of a lever, said links being slotted to normally allow free movement of the frames, a spring acting on said lever to urge either frame into wheel connecting position and the other frame out of connecting position, means for actuating one frame, means for actuating the other frame, the links acting upon the frame first actuated to disconnect the associated wheel when the other frame is actuated.

22. In an accounting device, a pair of counter wheels for adding debit and credit items and the complements of such items, a driving means for adding the true numbers or the complements of the items on the wheels, devices for connecting the wheels with the driving means, and a control mechanism for said devices having three controlling positions; in one position both wheels are free to add true numbers, in another position the credit wheel adds true numbers and the debit wheel adds complements, and in the third position the debit wheel adds the true numbers and the credit wheel accumulates the complements of the items.

23. In a machine of the class described, a pair of accumulators, differential item entering devices, means under control of said devices for entering true numbers and complements in said accumulators, printing means, means for selecting the accumulator indicating a positive result to control the printing means, and means for taking a progressive total under control of the selected accumulator.

24. In an accounting device, accumulators, driving means, devices for controlling the engagement of the accumulators with the driving means, a shaft having connections to said devices, a pair of arms on said shaft, a pair of levers, means for positively rocking said levers in opposite directions, and means for selectively coupling one of said arms with one of said levers.

25. In an accounting device, accumulators, driving means, devices for controlling the engagement of the accumulators with the driving means, a shaft having connections to said devices, a pair of arms on said shaft, a pair of levers, means for positively rocking said levers in opposite directions, and a perforated record controlled means for selectively coupling one of said arms with one of said levers.

26. In an accounting device, accumulators, driving means, devices for controlling the engagement of the accumulators with the driving means, a shaft having connections to driving means, a pair of arms on said shaft, a pair of levers, means for positively rocking said levers in opposite directions, means for selectively coupling one of said arms with one of said levers, and manipulative means for disabling said coupling means.

27. In an accounting machine, a pair of accumulators, driving means, debit and credit item entering means, devices adapted to engage the accumulators with the driving means to add the complement of the amount of the item on one accumulator and the true amount on the other accumulator, means for selectively conditioning said devices so that a selected one of the accumulators is engaged to add the complement, and means for controlling the selective means so that neither accumulator adds the complement.

28. In an accounting device, an accumulator wheel registering a total amount, means for turning the wheel to take a reading of the total amount registered on said wheel, means for recording said total, and electrically controlled means for restoring said wheel to its amount registering position during the total reading operation.

29. In a totaling device, an accumulator wheel, means for rotating said wheel during a total taking operation, means for stopping said wheel at the zero position, and an electromagnetically controlled means for disabling the last mentioned means during the taking of a progressive total.

30. In a totaling device, an accumulator wheel, driving means for rotating the wheel, means for reading the amount registered on the wheel when it is in a certain position during rotation, means for disconnecting the wheel from the driving means when it arrives in the certain position, means for maintaining the connection between the wheel and the driver until the wheel receives a complete rotation in taking a total, and an electromagnet for controlling the last mentioned means.

31. In a totaling device, a wheel registering the sum of accumulated items, means for giving the wheel a complete rotation, means for reading the amount registered on the wheel as it passes the zero position, means tending to disconnect the wheel at zero, and electromagnetically controlled means cooperating with the last mentioned means to prevent the disconnection of the wheel at zero.

32. In an accounting device, an accumulator wheel, driving means for rotating said wheel, means for disconnecting said wheel from the driving means at zero position during total taking, a magnet energized during total taking, connections from the armature of said magnet, and means whereby said connections cooperate with said disconnecting means to keep the wheel connected with the driving means during total taking.

33. In an accounting device, an accumulator wheel, driving means, a clutching frame for connecting said wheel with the driving means, a spring for urging said frame in and out of wheel connecting position, an arm for holding the spring so that it urges the frame in wheel connecting position, means for releasing the arm to allow the spring to urge the frame into wheel disconnecting position at the zero position of the wheel during totaling, and means for supporting the arm during total taking.

34. In an accounting device, an accumulator wheel, a constantly rotating driving means, means for connecting said wheel with the driving means for a complete rotation, means for disconnecting said wheel from the driving means before it receives a complete rotation, and electromagnetically controlled means for disabling said disconnecting means.

35. In an accounting machine, an accumulator comprising a plurality of accumulator wheels, driving means, means for connecting the wheels with the driving means, devices for disconnecting the wheels from the driving means when the wheels reach zero position during a totaling operation, magnets, one for each wheel and certain of which are energized during a totaling operation, and connections from the armatures of the magnets for disabling said devices.

36. In a machine of the class described, an accumulator comprising a plurality of accumulator wheels, driving means, means for connecting the wheels with the driving means, devices for separately disconnecting the wheels from the driving means as they reach the zero position during total taking, and electromagnetically operated means for separately disabling certain of said devices so that the associated wheels are not disconnected from the driving means at zero position during totaling.

37. In a machine of the class described, a pair of accumulators, driving means, means for connecting the wheels of both accumulators with the driving means, means for disconnecting the wheels of one accumulator as they reach the zero position during a totaling operation, and additional means for keeping the wheels of the other accumulator connected for a progressive total during the same operation.

38. In a machine of the class described, a pair of accumulators adapted to add complements and true numbers representing debit and credit amounts to arrive at a balance, means for selecting the accumulator which contains the balance as a true number, and means for taking a progressive total of the selected accumulator and printing a record of the amount contained by it.

39. In a machine of the class described, a pair of accumulators adapted to add complements and true numbers representing debit and credit amounts to arrive at a balance, means for determining which accumulator holds the balance as a true number, means for printing a record of the balance under the control of the accumulator, and means for simultaneously taking a progressive total of the other accumulator.

40. In a machine of the class described, a pair of accumulators adapted to add complements and true numbers representing debit and credit amounts to arrive at a balance, means for selecting the accumulator which contains the balance as a true number, means for taking progressive totals of both accumulators, and means for printing a record of the amount contained by the selected accumulator.

In testimony whereof I hereto affix my signature.

JOHN ROYDEN PEIRCE.